United States Patent
Bartusiak et al.

(10) Patent No.: US 9,624,406 B2
(45) Date of Patent: Apr. 18, 2017

(54) MICROSTRUCTURED TAPE COMPRISING COEXTENSIVE, INTERSECTING PAINT-RETENTION AND HAND-TEAR PATTERNS

(71) Applicant: 3M INNOVATIVE PROPERTIES COMPANY, St. Paul, MN (US)

(72) Inventors: Joseph T. Bartusiak, Osseo, MN (US); Graham M. Clarke, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 90 days.

(21) Appl. No.: 14/380,882

(22) PCT Filed: Feb. 18, 2013

(86) PCT No.: PCT/US2013/026568
§ 371 (c)(1),
(2) Date: Aug. 25, 2014

(87) PCT Pub. No.: WO2013/130293
PCT Pub. Date: Sep. 6, 2013

(65) Prior Publication Data
US 2015/0010700 A1   Jan. 8, 2015

Related U.S. Application Data

(60) Provisional application No. 61/604,120, filed on Feb. 28, 2012.

(51) Int. Cl.
| | | |
|---|---|---|
| B32B 7/12 | (2006.01) | |
| C09J 7/02 | (2006.01) | |
| B05D 3/00 | (2006.01) | |
| B05D 3/12 | (2006.01) | |
| B05B 15/04 | (2006.01) | |

(52) U.S. Cl.
CPC ......... *C09J 7/0275* (2013.01); *B05B 15/0456* (2013.01); *B05B 15/0481* (2013.01); *B05D 3/002* (2013.01); *B05D 3/12* (2013.01); *C09J 7/026* (2013.01); *C09J 2201/122* (2013.01); *C09J 2201/16* (2013.01); *C09J 2201/606* (2013.01); *C09J 2203/31* (2013.01); *C09J 2400/226* (2013.01); *C09J 2423/046* (2013.01); *C09J 2433/00* (2013.01); *Y10T 428/15* (2015.01)

(58) Field of Classification Search
None
See application file for complete search history.

(56) References Cited

U.S. PATENT DOCUMENTS

| | | | |
|---|---|---|---|
| 3,088,848 A * | 5/1963 | Tritsch | C09J 7/0275 428/343 |
| 4,450,194 A * | 5/1984 | Kauffman | B32B 5/24 428/172 |
| 4,465,729 A | 8/1984 | Cancio et al. | |
| 4,581,087 A | 4/1986 | Johnson | |
| 4,781,957 A | 11/1988 | Brown | |
| 5,212,011 A * | 5/1993 | Ishikawa | C09J 7/0271 428/167 |
| 5,650,215 A | 7/1997 | Mazurek | |
| 6,149,203 A * | 11/2000 | Hanlon | G09F 3/0292 283/101 |
| 6,524,675 B1 | 2/2003 | Mikami | |
| 6,635,334 B1 * | 10/2003 | Jackson | B32B 3/10 428/132 |
| 7,677,146 B2 | 3/2010 | Gardiner | |
| 8,530,021 B2 * | 9/2013 | Bartusiak | B32B 38/06 428/167 |
| 2003/0178124 A1 | 9/2003 | Mikami | |
| 2003/0235677 A1 * | 12/2003 | Hanschen | B29C 59/022 428/156 |
| 2003/0235678 A1 | 12/2003 | Graham et al. | |
| 2004/0001931 A1 | 1/2004 | Izzi | |
| 2005/0058829 A1 * | 3/2005 | Ukei | B32B 7/12 428/343 |
| 2006/0188704 A1 | 8/2006 | Mikami | |
| 2007/0014997 A1 | 1/2007 | Zhang | |
| 2007/0015288 A1 * | 1/2007 | Hulteen | G01N 21/554 436/165 |
| 2007/0026197 A1 | 2/2007 | Suga | |
| 2008/0049341 A1 | 2/2008 | Epstein | |
| 2009/0202804 A1 * | 8/2009 | Balakoff | B32B 7/12 428/213 |
| 2010/0302479 A1 | 12/2010 | Aronson | |
| 2014/0044912 A1 * | 2/2014 | Clarke | C09J 7/0264 428/43 |
| 2015/0166844 A1 * | 6/2015 | Clarke | B29B 11/12 428/43 |

FOREIGN PATENT DOCUMENTS

| | | |
|---|---|---|
| EP | 0194042 | 9/1986 |
| EP | 0373646 | 6/1990 |
| JP | 9-24585 | 1/1997 |
| JP | 2004-249675 | 9/2004 |
| KR | 2002-034079 | 5/2002 |
| WO | WO 00/73082 A1 | 12/2000 |
| WO | WO 01/44398 A1 | 6/2001 |
| WO | WO 2013-130211 | 9/2013 |

OTHER PUBLICATIONS

Ken, Ishikawa, "Adhesive Tape", machine translation of JP 2002-317161A, published Oct. 31, 2002.*

(Continued)

*Primary Examiner* — Anish Desai

(74) *Attorney, Agent, or Firm* — Kenneth B. Wood

(57) ABSTRACT

Tape backings with a first major side and an oppositely-facing second major side, wherein the first major side includes coextensive, intersecting microstructured paint-retention and hand-tear patterns; and, tapes including such backings, and methods of making and using such tapes and tape backings.

23 Claims, 11 Drawing Sheets

(56) References Cited

OTHER PUBLICATIONS

Rick. F. Tate et al., "HDPE Blending Technology for Enhanced LDPE Film Properties", ANTEC 2000 Plastics conference proceedings, vol. III, May 7-11, 2000.*
Kiyotsugu Akima et al., "Method of Producing Adhesive Tape", English translation of JP 3514790, Mar. 31, 2004.*
Definition of term "notch" from Merriam Webster Dictionary, Jul. 6, 2016.*
Definition of term "rib" from Merriam Webster Dictionary, Jul. 5, 2016.*
Kotaro, Funahiki, "Hand Tearable Synthetic Resin Film and Hand Tearable Adhesive Tape", English translation of JP 06285978, Oct. 11, 1994.*
Extended European Search Report, EP13754994.5, Sep. 17, 2015, 4 pages.
International Search Report for PCT Application No. PCT/US2013/026568 mailed on Jun. 26, 2013, 4 pages.

\* cited by examiner

MICROSTRUCTURED TAPE COMPRISING COEXTENSIVE, INTERSECTING PAINT-RETENTION AND HAND-TEAR PATTERNS

BACKGROUND

Masking tapes have been used for some time in the painting of surfaces. Masking tapes are often comprised of creped paper with a pressure-sensitive adhesive on one surface.

SUMMARY

Herein are disclosed tape backings with a first major side and an oppositely-facing second major side, wherein the first major side includes coextensive, intersecting microstructured paint-retention and hand-tear patterns; and, tapes including such backings, and methods of making and using such tapes and tape backings. These and other aspects of the invention will be apparent from the detailed description below. In no event, however, should the above summaries be construed as limitations on the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "up" and "down", and "first" and "second" may be used in this disclosure, it should be understood that those terms are used in their relative sense only unless otherwise noted. The terms outward and inward refer to directions generally away from the interior of backing 2 of tape 1, and toward the interior of backing 2 of tape 1, respectively. Terms such as same, equal, uniform, constant, and the like, as applied to a quantifiable property or attribute, mean within +/−5%, unless otherwise specifically defined. As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match.

DETAILED DESCRIPTION

Figure 1:
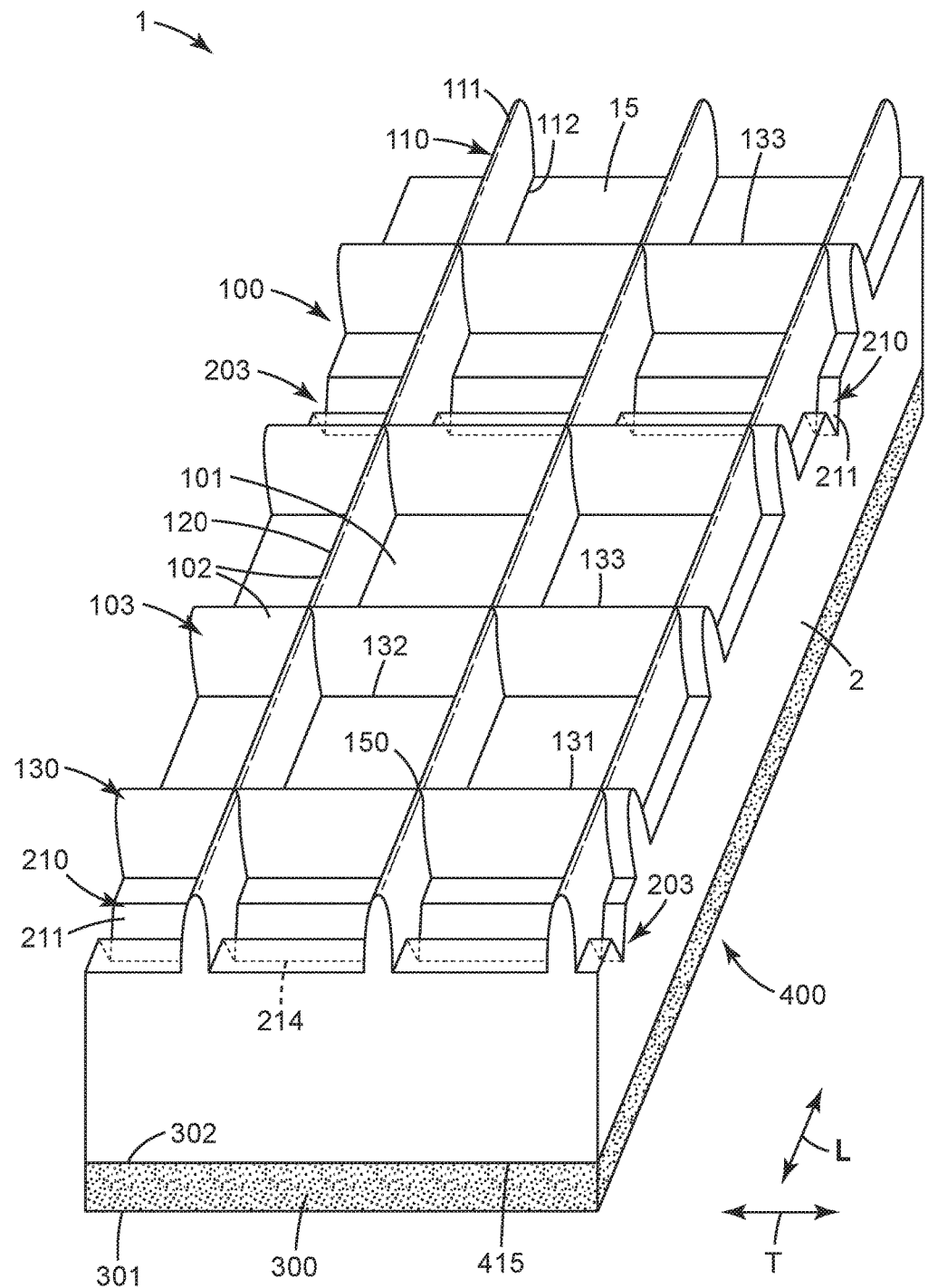
FIG. 1 is a perspective view, from the first major side, of a portion of an exemplary microstructured tape comprising coextensive, intersecting microstructured paint-retention and hand-tear patterns.
Figure 2:
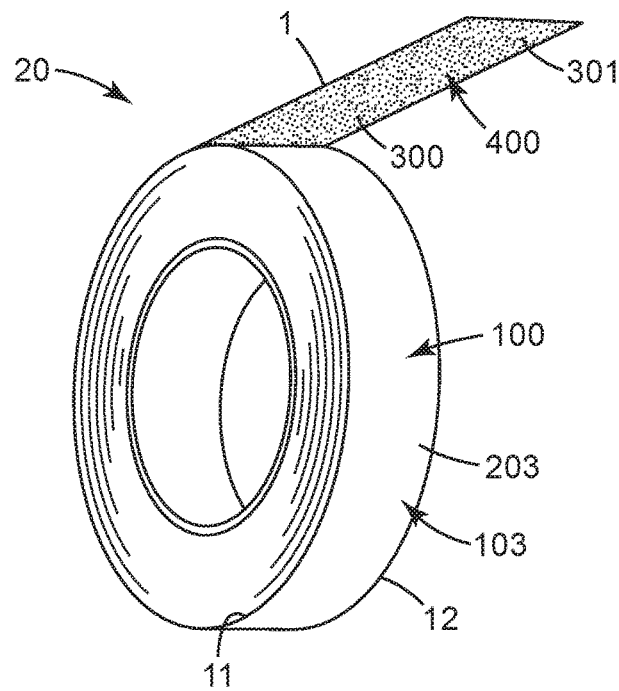
FIG. 2 is a perspective view of an length of exemplary microstructured tape, in the form of a roll.
Figure 3:
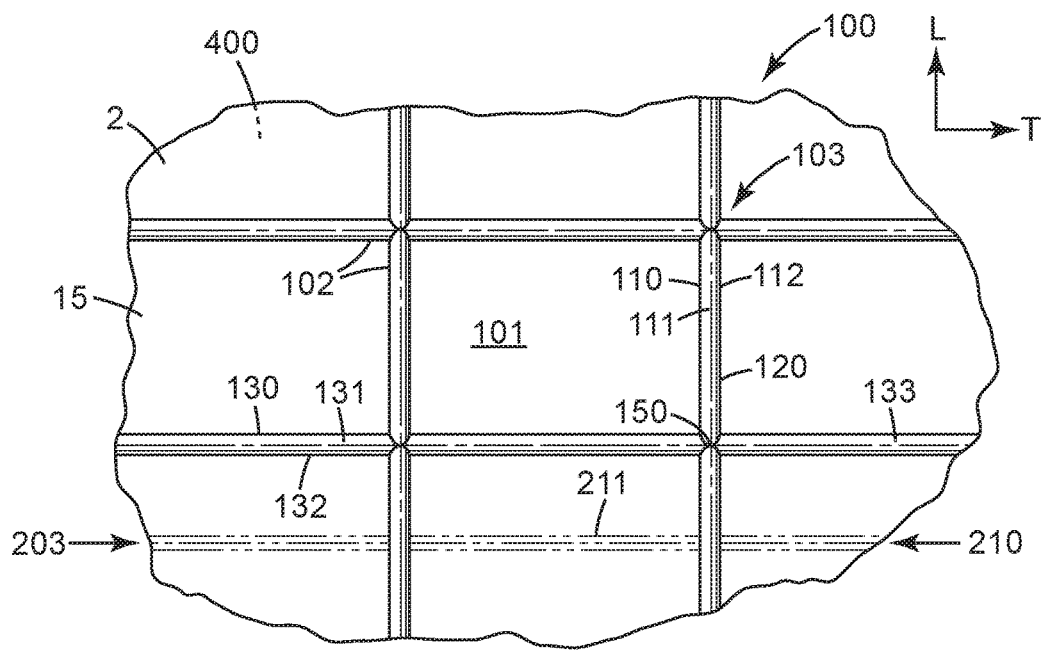
FIG. 3 is a plan view of a portion of an exemplary microstructured paint-retention pattern.
Figure 4:
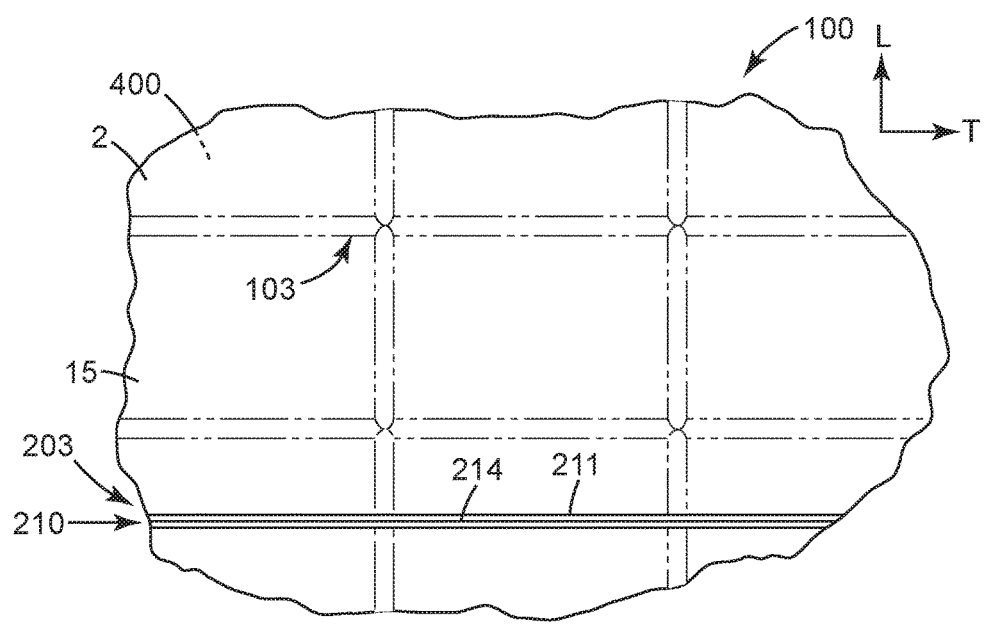
FIG. 4 is a plan view of a portion of an exemplary microstructured hand-tear pattern.

Shown in FIG. 1 is a perspective view, from the first major side, of a portion of an exemplary microstructured tape 1 comprising a backing 2. Shown in FIG. 2 is a perspective view of microstructured tape 1 in the form of a roll 20. FIGS. 3 and 4 show plan views of first major side 100 of backing 2, with an exemplary paint-retention pattern 103, and an exemplary hand-tear pattern 203, respectively highlighted in FIG. 3 and FIG. 4. (In these and all other figures in which they appear, the term "T" designates the transverse axis, and the term "L" designates the longitudinal axis, of tape 1 and backing 2 thereof.) Tape 1 and backing 2 thereof comprise a longitudinal axis and length, a transverse axis and width and minor transverse edges 11 and 12 (i.e., e.g., as seen in FIG. 2), and a thickness.

As shown in FIGS. 1 and 2, pressure-sensitive adhesive 300 is disposed on second major side 400 of backing 2, e.g. with second major adhesive surface 302 of pressure-sensitive adhesive 300 in contact with, and adhesively adhered to, second major surface 415 of backing 2. As shown in FIG. 2, microstructured tape 1 may be conveniently provided in an elongate length in the form of a roll, e.g. a self-wound roll without a release liner, from which a length of tape 1 may be removed by hand-tearing (although other methods involving scissors or other cutting implements may be used if desired). First major adhesive surface 301 of pressure-sensitive adhesive may then be used to adhere the length of tape 1 to a surface portion that is desired to be masked. An adjacent surface portion may then be painted without paint penetrating onto the masked surface portion.

As shown in FIGS. 1 and 3, backing 2 comprises first major side 100 that comprises a microstructured paint-retention pattern 103. As shown in FIGS. 1 and 4, first major side 100 of backing 2 further comprises a microstructured hand-tear pattern 203. (In FIG. 3, pattern 203 is shown in phantom for ease of presentation of pattern 103, with the opposite being the case in FIG. 4). Microstructured hand-tear pattern 203 and microstructured paint-retention pattern 103 are coextensive on first major side 100 of backing 2. By this is meant that the two patterns are overlapping; that is, they are both present in at least some macroscopic areas (i.e., areas of greater than about 2 mm²) of first major side 100. Such an arrangement may be contrasted with arrangements in which a hand-tear pattern is present only in certain areas that do not comprise a paint-retention pattern, and vice-versa. In specific embodiments, both microstructured patterns extend, and overlap with each other, over substantially the entirety of first major side 100 of backing 2.

Microstructured hand-tear pattern 203 and microstructured paint-retention pattern 103 are intersecting patterns. By this is meant that long axes of at least some partitions of the paint-retention pattern intersect long axes of at least some lines of weakness of the hand tear pattern, at some location within the elongate lengths of the partitions and the lines of weakness. Microstructures of each pattern may, but do not have to, physically intersect with microstructures of the other pattern, as discussed later herein.

By microstructured hand-tear pattern 203 is meant a multiplicity of lines of weakness 210 (as shown in exemplary manner in FIGS. 1 and 4) present on first major side 100 of backing 2, with each line of weakness comprising a long axis that is oriented at least generally transversely to backing 2, with each line of weakness extending at least generally across the width of backing 2, and with the lines of weakness being spaced along the longitudinal axis of backing 2. Lines of weakness 210 may enhance the ability of backing 2 of tape 1 to be hand-torn at least generally transversely across its width so as to remove a length of backing 2 and tape 1 from a larger length (e.g., from a roll). By at least generally transversely (as used here and elsewhere herein) it is not meant that lines of weakness 210 must necessarily be oriented in strict alignment with the transverse axis of backing 2 (e.g., in the specific manner shown in FIGS. 1 and 4). Rather, the term generally transversely encompasses any design in which lines of weakness 210 are at any orientation within plus or minus about 45 degrees of the transverse axis of backing 2. In further embodiments, a line of weakness 210 (i.e., a long axis thereof) may be oriented within plus or minus about 30 degrees, plus or minus about 20 degrees, or plus or minus about 10 degrees, of the transverse axis of backing 2. In specific embodiments, lines of weakness 210 may be oriented in strict alignment with the transverse axis of backing 2, meaning that they are oriented within plus or minus about 5 degrees of the transverse axis of backing 2.

Figure 10:
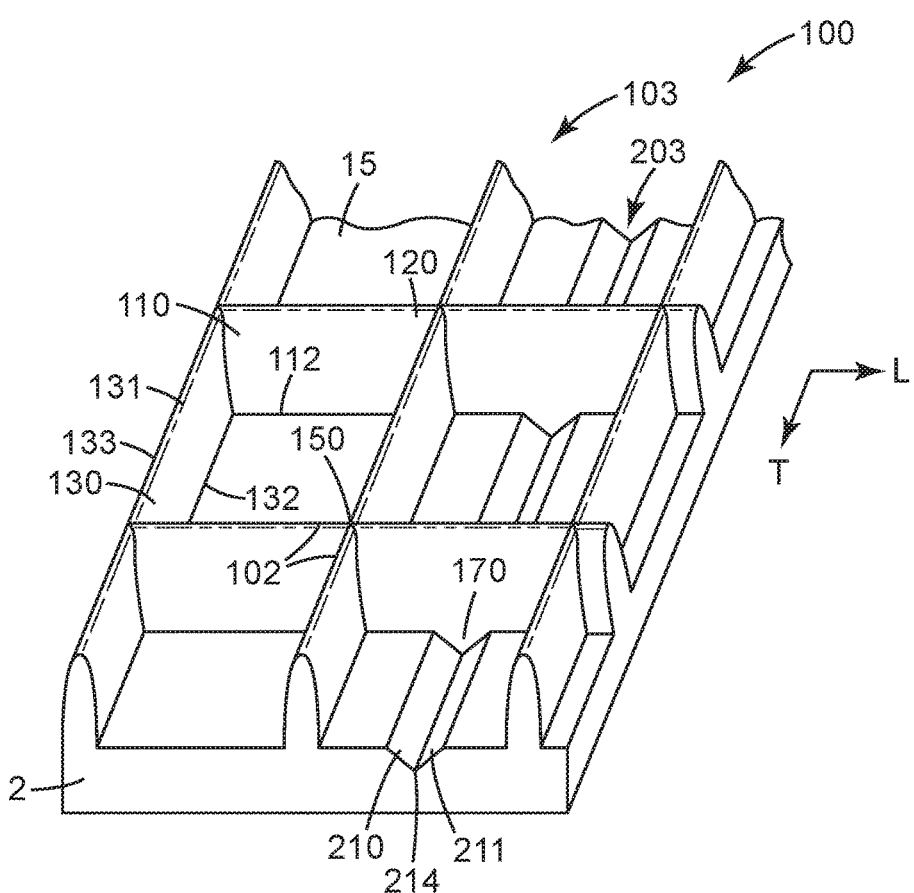
FIG. 10 is a perspective view, from the first major side, of a portion of an exemplary microstructured tape backing comprising coextensive, intersecting microstructured paint-retention and hand-tear patterns.

Each individual line of weakness 210 may be a continuous line of weakness that is provided by a recess in first major side 100 of backing 2, or may be a discontinuous line of weakness that is collectively provided by a multiplicity of recesses in first major side 100 of backing 2. As used herein, the term discontinuous line of weakness has the specific meaning of a line of weakness collectively provided by a multiplicity of spaced-apart recesses (e.g., of the type exemplified in FIGS. 6-9). A line of weakness in the form of a recess (e.g., a groove) that is continuous except for being interrupted by one or more portions of paint-retention partitions that traverse across the lateral width of the line of weakness (as described later herein), is a continuous line of weakness as defined herein. Thus, line of weakness 210 (groove 211) shown in FIG. 10 is a continuous line of weakness, even though it is interrupted by partitions 110. Similar considerations apply to lines of weakness 210 of FIGS. 11-15.

By a recess is meant a feature at least some of whose surface(s) are recessed below (i.e., inward toward the interior of backing 2) first major surface 15 (which may be, but is not necessarily, a flat surface) of first major side 100 of backing 2, so as to comprise an open-ended, outward-facing cavity (e.g., a depression, divot, notch, trench, groove, furrow, hole, etc.). Recesses as defined herein do not encompass interior cavities, voids, pores or the like as might be present in some materials (e.g., microporous materials, foams and the like), nor do they encompass such pores as might be present on the surface of open-celled foams and the like. By microstructured hand-tear pattern is further meant that the recesses that provide lines of weakness 210 comprise predetermined, molded structures (e.g., as obtained by molding a polymeric thermoplastic resin against a tooling surface that comprises the negative of the recesses desired to be provided on first major side 100 of backing 2) with dimensions ranging from about 5 to about 400 microns in at least two orthogonal directions. One of these orthogonal directions is normal to the plane of backing 2 thus this dimension comprises the recess depth. By way of example, for a line of weakness 210 that is provided by a recess comprised of an elongate groove 211 as shown in FIGS. 1 and 4, the recess depth is the distance that the lowest (inwardmost) point 214 of groove 211 is spaced inward from first major surface 15 of backing 2, along an axis normal to the major plane of backing 2. Often, the lateral width of groove 211 (lateral meaning in a direction across the width of the groove, which direction may often be generally aligned with the longitudinal axis of backing 2) may comprise the second, orthogonal direction. Thus, if the depth of groove 211 and the lateral width of groove 211 are both in between about 5 and about 400 microns at any location along the length of groove 211, groove 211 is by definition a microstructured feature irrespective of the fact that it may have an extremely long length. In some embodiments, the recesses that provide lines of weakness 210 are present in regular, predictable, repeating patterns.

Figure 5:
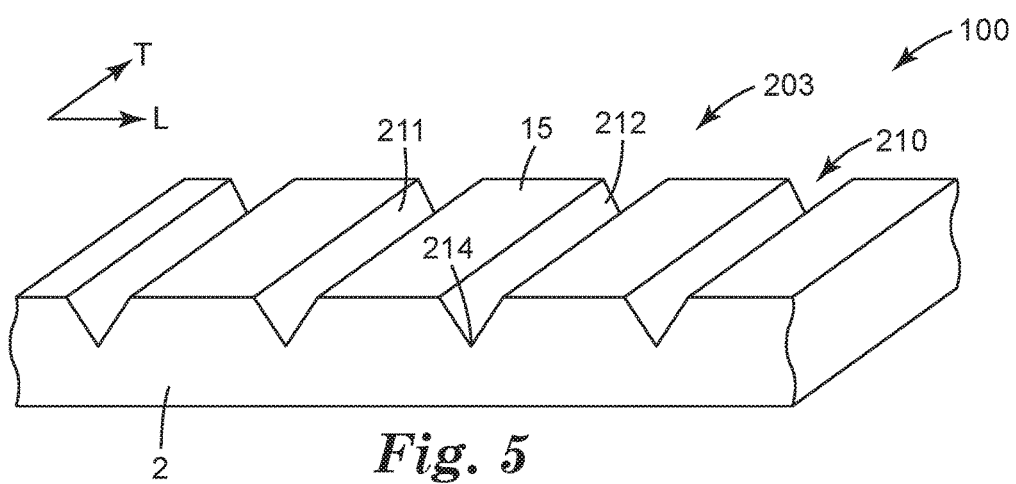
FIG. 5 is a perspective view of a portion an exemplary microstructured hand-tear pattern.
Figure 6:
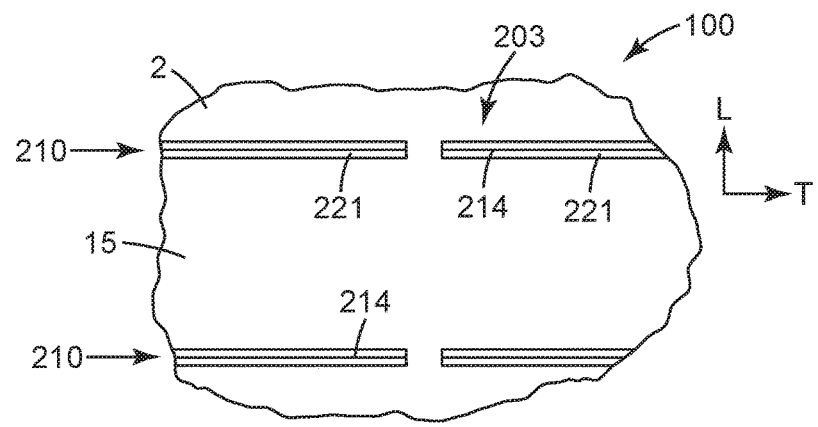
FIG. 6 is a plan view of a portion of another exemplary microstructured hand-tear pattern.
Figure 7:
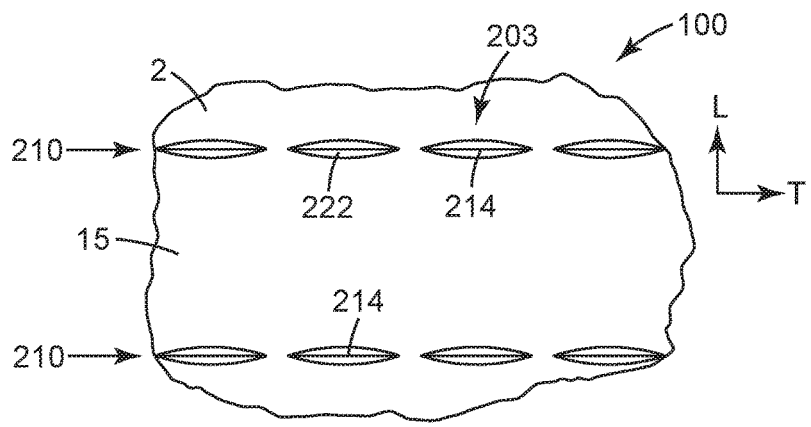
FIG. 7 is a plan view of a portion of another exemplary microstructured hand-tear pattern.
Figure 8:
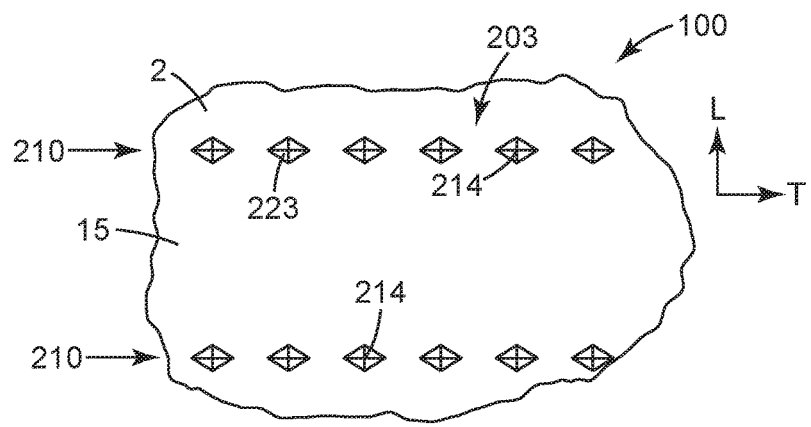
FIG. 8 is a plan view of a portion of another exemplary microstructured hand-tear pattern.
Figure 9:
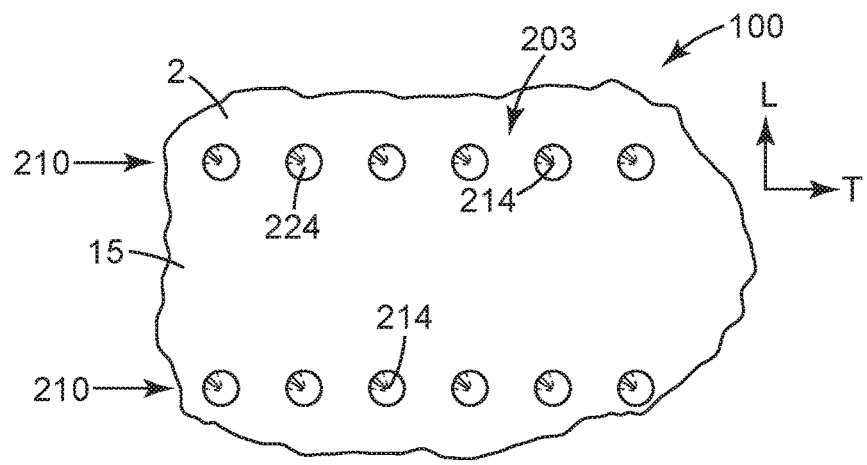
FIG. 9 is a plan view of a portion of another exemplary microstructured hand-tear pattern.

The presence of a line of weakness 210 as provided by one or more recesses does not imply that a flat surface must necessarily be present between individual lines of weakness. Rather, in some embodiments the first major side of backing 2 may comprise a hand-tear pattern that, for example, comprises lines of weakness in the form of grooves (valleys) interspersed between ridges, without any flat areas necessarily being provided between a grooves and an adjacent ridge. Examples of such lines of weakness are shown in FIGS. 5 and 6 of U.S. patent application Ser. No. 13/042, 536, filed Mar. 8, 2011, entitled Microstructured Tape, which application is incorporated by reference herein in its entirety.

In various embodiments, the center-to-center spacing between lines of weakness 210 (in the longitudinal direction down backing 2) may be at least about 0.40 mm, at least about 0.60 mm, or at least about 0.80 mm. In further embodiments, the spacing of lines of weakness 210 may be at most about 1.4 mm, at most about 1.2 mm, or at most about 1.0 mm. In various embodiments, the spacing between lines of weakness 210 may be constant down the length of backing 2, or may vary. In some embodiments, some or all lines of weakness 210 may be parallel to each other. In some embodiments, lines of weakness 210 may be interspersed, in the longitudinal direction along backing 2, by portions of major surface 15, whether such portions are flat, or comprise texture (e.g., so as to provide a matte finish), both as discussed later herein. (An arrangement in which lines of weakness 210 are interspersed by substantially flat portions of surface 15 is shown in exemplary manner in FIG. 5.) In some embodiments, lines of weakness 210 may also be interspersed by some portions of microstructured paint-retention pattern 103. (An arrangement in which lines of weakness 210 are interspersed by transversely-extending partitions 130 of paint-retention pattern 103 is shown in exemplary manner in FIG. 1.)

In some embodiments, a recess that provides a line of weakness 210 may comprise an elongate groove 211 e.g. that extends continuously from one minor edge 11 of backing 2 to other minor edge 12 of backing 2. In various embodiments, the depth of groove 211 may be at least about 10 microns, at least about 15 microns, or at least about 20 microns. In further embodiments, the depth of groove 211 may be at most about 60 microns, at most about 50 microns, or at most about 40 microns. In various embodiments, the width of groove 211 (at its widest part) may be at least about 20 microns, at least about 40 microns, or at least about 60 microns. In further embodiments, the width of groove 211 may be at most about 140 microns, at most about 120 microns, or at most about 100 microns. The width of groove 211 may be constant along the length of groove 211, or it may vary along the length. In various embodiments, groove 211 may be configured so as to comprise sidewalls (e.g., planar sidewalls 212 as shown in the exemplary design of FIG. 5), a lowest point (that is furthest inward relative to major surface 15, as signified by feature 214 of FIGS. 1 and 5), etc., in any desired manner.

In some embodiments, lines of weakness 210 may be discontinuous by way of being collectively comprised of recesses that are spaced across the transverse width of first side 100, with e.g. major surface 15 of first side 100 of backing 2 being interspersed between the individual transversely-spaced recesses. In further detail, in embodiments of the latter type, lines of weakness 210 may be discontinuous by way of being provided by a multiplicity of (e.g., two or more) recesses, spaced generally along a long axis (which may be, but does not necessarily have to be, a strictly linear path) of discontinuous line of weakness 210 is that oriented at least generally transversely to backing 2, and acting in combination. In a specific example exemplified in FIG. 6, discontinuous grooves 221 may be provided that are interspersed with gaps (e.g., bearing first major surface 15) and that thus do not extend continuously across the entire width of backing 2. In a modification of this approach shown in FIG. 7, a discontinuous line of weakness 210 is provided collectively by a multiplicity of elongate oval recesses 222 that are aligned generally linearly across the transverse width of backing 2, each oval recess comprising a long axis that is generally oriented across the transverse width of backing 2. In a slight modification of this approach shown in FIG. 8, recesses 223 comprise diamond-shaped recesses aligned generally linearly across the transverse width of backing 2, each diamond-shaped recess comprising a long axis that is generally oriented across the transverse width of backing 2. It should be noted that such approaches do not necessarily require that individual recesses comprise a long axis that is generally oriented across the transverse width of backing 2, however. Thus, in the exemplary embodiment of FIG. 9, lines of weakness 210 are collectively provided by rows of generally circular recesses 224. (In FIGS. 5-9, the deepest-inward point of a recess is designated by the reference number 214; also, paint-retention pattern 103 is omitted from FIGS. 5-9, for ease of depiction of lines of weakness 210 of hand-tear pattern 203).

In any of these embodiments comprising discontinuous lines of weakness comprised of a multiplicity of recesses, the depth of a recess may be e.g. at least about 10 microns, at least about 15 microns, or at least about 20 microns. In further embodiments, the recess depth may be at most about 60 microns, at most about 50 microns, or at most about 40 microns. If a recess has a long axis, the width of the recess may be constant along the length of the recess (as in FIG. 6), or it may vary along the length (as in FIGS. 7 and 8). In various embodiments, the width of a recess (measured at its widest point, and which may be the diameter in the case of a generally circular recess) may be at least about 20 microns, at least about 40 microns, or at least about 60 microns. In further embodiments, the width of a recess may be at most about 140 microns, at most about 120 microns, or at most about 100 microns. In various embodiments, the edge-to-edge spacing between nearest edges of adjacent recesses of a discontinuous line of weakness (e.g., as measured generally along the transverse axis of backing 2) may be at least about 10 microns, at least about 20 microns, or at least about 30 microns. In further embodiments, the edge-to-edge spacing between recesses may be at most about 400 microns, at most about 100 microns, or at most about 60 microns.

In any of the aforementioned continuous or discontinuous lines of weakness provided by one or more recesses, the depth of an individual recess may vary; and/or different recesses may comprise different depths (whether variable or constant). Recesses may be of different widths or of the same width. A recess width may vary along its inward-outward depth relative to the plane of backing 2 (e.g., when viewed in cross section), e.g. so that it is tapered as in grooves 211 of FIG. 1, and/or a recess can be any suitable shape when viewed in cross section. That is, a recess may comprise a constant width along its depth, may comprise a flat (planar) bottom, an arcuate bottom, etc., and/or vertical sidewalls, angled sidewalls, planar sidewalls, arcuate sidewalls etc. (planar, angled sidewalls are depicted in the exemplary embodiment of FIG. 5). The deepest point of a recess may comprise e.g. a line (as represented by feature 214 of FIG. 5); or, it may take some other form, in the case of a recess that is not V-shaped. Such a deepest point might be a flat plane, or may have any other suitable topography. A recess may or may not be symmetric when viewed in cross section. In short, any suitable design is permissible. All that is required is that the recesses be designed and arranged with appropriate geometry (e.g., depths, widths, spacings, etc.) so as to, individually or collectively, provide a line of weakness 210 that imparts the herein-described ability to hand-tear backing 2 at least generally transversely across its width.

Whether lines of weakness are continuous or discontinuous (with mixtures of both being encompassed within the disclosures herein), the spacing between individual lines of weakness 210 may be constant down the length of backing 2, or may vary. All of the lines of weakness do not have to be oriented at the same angle (e.g., relative to the transverse axis of backing 2). Furthermore, it should be noted that the concept of a line of weakness as disclosed herein does not imply that the recess or recesses that individually or collectively provide the line of weakness 210 must necessarily be aligned strictly in a straight line. Rather, for example a continuous line of weakness 210 may be provided by a continuous groove that is somewhat arcuate, wavy, sinusoidal, sawtooth, or the like, as long as its overall path is at least generally transversely across backing 2 in the manner disclosed above. Similarly, a multiplicity of recesses arranged along a somewhat arcuate, wavy, sinusoidal, sawtoothed etc. path may likewise provide a discontinuous line of weakness 210. In some embodiments, of course, a generally linear, or strictly linear, path may be desired.

Lines of weakness 210 as described herein may enhance or promote the ability of backing 2 to be torn by hand in such a way that the propagating tear is steered in a desired (e.g., an at least generally transverse) direction, e.g. along a desired path. However, it will be appreciated that in some cases (e.g., as might occur in the case of discontinuous lines of weakness each comprised of a multiplicity of recesses, in the case of continuous lines of weakness that are spaced closely together along the longitudinal axis of backing 2, etc.) the propagation of a tear may not be directly along a strictly straight-line path. For example, a tear may propagate along one line of weakness for a portion of the way across the transverse width of backing 2, and may then jump to a second, adjacent line of weakness (e.g., a recess thereof) and then continue propagating transversely along the second line of weakness, and so on. Such phenomena may be acceptable as long as it does not cause the tear propagation to unacceptably deviate from a desired (e.g. an at least generally transverse) path across the width of backing 2. Thus, the concept of a multiplicity of lines of weakness is used broadly herein, and encompasses cases in which it may not necessarily be easy, or possible, to discern exactly which particular line of weakness may be followed when backing 2 is hand-torn. All that is required is that the microstructured recesses, individually or collectively, are capable of causing a tear to initiate and propagate at least generally transversely across the width of backing 2 as described herein. In some embodiments, of course, it may be preferred that the tear progression occur generally, or completely, along a single line of weakness.

It will be appreciated that lines of weakness 210 may enhance the ability of a hand-tear to be initiated, in addition to enhancing the ability of a propagating hand-tear to be steered in a desired direction. As such, in some embodiments it may be advantageous for a recess that comprises at least a portion of a line of weakness to be present at minor edge 11 of backing 2, and likewise for a recess to be present at minor edge 12 of backing 2. This may be provided, for example, by a line of weakness that is a continuous groove (such as, e.g., exemplary groove 211 of FIGS. 1-3) that extends to minor edges 11 and 12 of backing 2. Or, in the case of a discontinuous line of weakness, the multiplicity of recesses that make up the line of weakness may be arranged such that a recess is present at minor edge 11 of backing 2, and that a recess is likewise present at minor edge 12 of backing 2. In either case, a line of weakness 210 is provided that extends across the entire transverse width of first major side 100 of backing 2, from one minor edge 11 to other minor edge 12.

By microstructured paint-retention pattern 103 is meant that first major side 100 of backing 2 tape 1 comprises a multiplicity of microreceptacles 101 that are defined (i.e., bounded, whether continuously or discontinuously) by microstructured partitions 102 (e.g., as shown in exemplary manner in FIGS. 1 and 3) and that are configured to capture and/or retain liquid paint that impinges upon first major side 100 of tape 1. As such, at least some of microreceptacles 101 are (e.g. when a length of tape 1 is unwound from a roll) in an exposed configuration on first major side 100 of backing 2 rather than being filled with, covered by, or submerged beneath, another layer or layers that would prevent liquid paint from entering microreceptacles 101 from a direction generally above first major side 100 of backing 2. (However, such an exposed configuration does not preclude partitions 102 from being coated with one or more conformal coatings, e.g. low adhesion backsizes and the like, in such manner that partitions 102 still define microreceptacles 101 that are capable of capturing and/or retaining liquid paint.) In various embodiments, each microreceptacle 101 may comprise an area of at least 10,000 square microns, at least about 15,000 square microns, or at least about 20,000 square microns. In further embodiments, each microreceptacle 101 may comprise an area of at most about 700,000 square microns, about 400,000 square microns, about 100,000 square microns, or about 70,000 square microns.

By microstructured partitions is meant that partitions 102 (which may be continuous or discontinuous, as discussed in detail herein) each comprise a predetermined, molded structure (e.g., as obtained by molding a polymeric thermoplastic resin against a tooling surface that comprises the negative of the features desired to be provided on first major side 100 of backing 2). It will be appreciated that molded structures and features as defined herein (with respect to partitions 102 as well as to recesses that provide lines of weakness 210) are distinguished from features that are achieved by post-processing (e.g., by coating, depositing, ablation, perforation, punching, drilling, and the like). By microstructured partition is also meant that a partition 102 comprises, somewhere along its length, a height ranging from about 10 microns to about 120 microns. In this context the partition height is the distance from major surface 15 of major side 100 of backing 2, to the outwardly-most extending portion of a partition, measured along an axis normal to the major plane of backing 2. By microstructured partition is further meant that a partition has a dimension ranging from about 5 microns to about 400 microns along at least one axis that is orthogonal to the plane of backing 2. By way of a specific example, for a partition 102 in the form of an elongate rib 120 as shown in FIG. 1, the partition height (i.e. the distance by which outwardmost portion (top) 111 of rib 120 is spaced outwardly from (i.e., above) first major surface 15 of backing 2, along an axis normal to the major plane of backing 2), may be in the range of 10 to 120 microns. And, the lateral width of rib 120 (measured at any point, ranging from the base 112 to the top 111 of rib 120) may be in the range of about 5 microns to about 400 microns. If so, rib 120 is by definition a microstructured feature irrespective of the fact that it may have an extremely long length. In some embodiments, microstructured partitions 102 are present in regular, predictable, repeating patterns.

In various embodiments, the height of partitions 102 (whether in the form of continuous elongate ribs, discontinuous rib segments, posts, etc., as discussed later herein) may be at most about 110 microns, at most about 100 microns, at most about 90 microns, or at most about 80 microns. In further embodiments, the height of partitions 102 may be at least about 20 microns, at least about 30 microns, at least about 40 microns, or at least about 50 microns. In various embodiments, at least some of partitions 102 may be tapered (e.g., as shown in exemplary illustration in FIG. 1) so as to comprise a top with at least one dimension, e.g. lateral width, that is less than 80%, less than about 60%, or less than about 40%, of the corresponding dimension of the partition base. For example, ribs 120 and/or ribs 133 may be tapered, as in FIG. 1, so that their width at tops 111/131 is less than about 80% of their width at bases 112/132, respectively. The top of partitions 102 (e.g., as exemplified by tops 111 and 131 of elongate ribs 120 and 133, respectively) may comprise a generally flat area, or may be smoothly curved. Any portion (e.g., top, body, base) of at least some partitions 102 may optionally comprise small-scale secondary features or the like.

Figure 16:
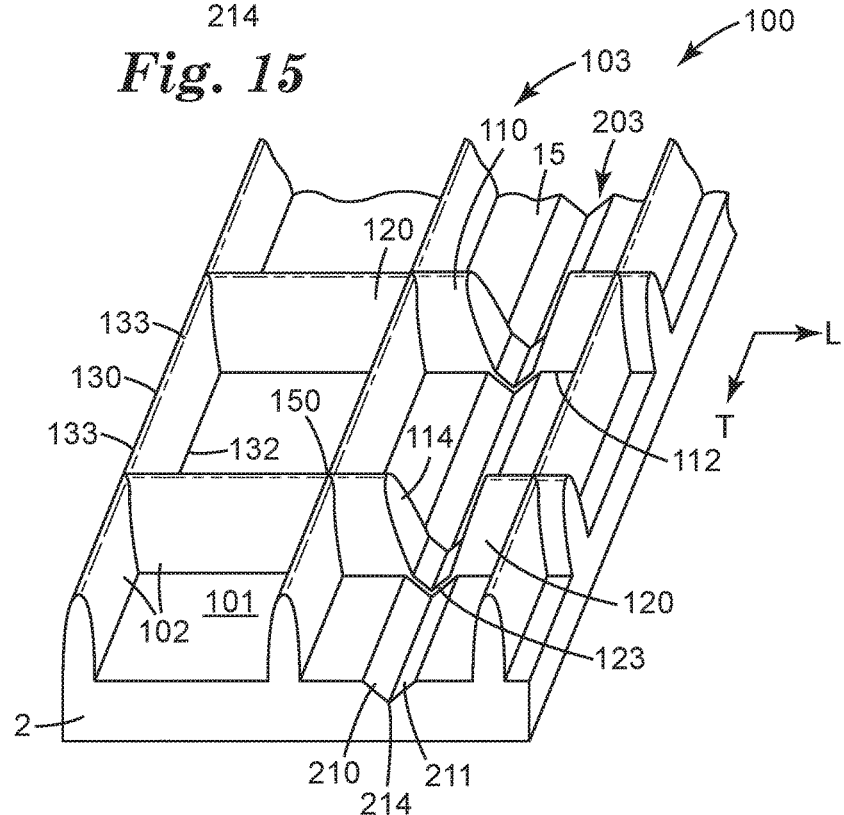
FIG. 16 is a perspective view, from the first major side, of a portion of an another exemplary microstructured tape backing comprising coextensive, intersecting microstructured paint-retention and hand-tear patterns.

In some embodiments, microstructured partitions 102 may comprise a multiplicity of first elongate (e.g., linear) partitions 110 that may not physically intersect with each other, and a multiplicity of second elongate partitions 130 that may not physically intersect with each other, with at least some of first partitions 110 intersecting with at least some of second partitions 130 at intersections 150 so as to define microreceptacles 101 thereby. Such intersecting of first partitions 110 with second partitions 130 may comprise actual physical intersections of first and second partitions 110 and 130, as with intersections 150 of FIGS. 1 and 10. Or, such an intersection of first partitions 110 with second partitions 130 may comprise the intersecting of paths followed by discontinuous partitions, as with intersections 150 of first partitions 110 and second partitions 130 in FIGS. 16 and 17 (discussed later herein). In some such cases, such an intersection of first partitions 110 with second partitions 130 may comprise a point in space rather than an actual physical portion of a partition.

As mentioned, first partitions 110 may follow paths such that the individual first partitions 110 do not physically intersect with each other, and second partitions 130 may follow paths such that the individual second partitions 130 do not physically intersect with each other. In some embodiments, first partitions 110 may be strictly linear and parallel to each other along substantially their entire elongate length; likewise, second partitions 130 may be strictly linear and parallel to each other along substantially their entire elongate length. In other embodiments, at least some of first partitions 110 may be nonlinear (e.g., may follow a path that is arcuate, sinusoidal, etc.) but may be locally parallel to each other (e.g., at their points of closest approach to each other), as may second partitions 130. In other embodiments, at least some of first partitions 110 may not be locally parallel, but may still follow overall paths so that the individual first partitions 110 do not intersect with each other, as may second partitions 130. In some embodiments, the spacings between first partitions 110 may be constant, the spacings between second partitions 130 may be constant, and the first and second partition spacings may be the same (i.e., so that microreceptacles 101 are square). In other embodiments, first partitions 110 may be spaced different distances from each other than second partitions 130 are spaced from each other (i.e., microreceptacles 101 defined by partitions 110 and 130 may be rectangular rather than square). The spacings between individual partitions 110, and/or between individual partitions 130, may vary rather than being constant.

In some embodiments, first elongate partitions 110 may be provided so that their long axes are generally orthogonal to the long axes of second partitions 130 (whether partitions 110 and/or 130 are continuous or discontinuous along their elongate lengths, as discussed in detail later herein), e.g. as in the exemplary embodiment of FIGS. 1 and 3. The terminology of generally orthogonal is used broadly and is not intended to limit to a case in which first and second partitions 110 and 130 are oriented strictly at right angles to each other. Rather, generally orthogonal encompasses any angle between 70 and 110 degrees (e.g., such that microreceptacles 101 may be somewhat diamond-shaped rather than square). In further embodiments, the angle between first and second partitions may be between 80 and 100 degrees, or between 88 and 92 degrees (e.g., so as to provide generally square microreceptacles).

First and second partitions 110 and 130 of first major side 100 of backing 2 may be provided at any convenient orientation with regard to lines of weakness 210 of second major side 400 of backing 2. However, in some embodiments some or all of second partitions 130 may be substantially aligned with lines of weakness 210, meaning having a long axis that is oriented within plus or minus about 20 degrees of the long axis of lines of weakness 210. In further embodiments, some or all of second partitions 130 may have a long axis that is oriented within plus or minus about 10 degrees of the long axis of lines of weakness 210. In specific embodiments, some or all of second partitions 130 may be in strict alignment with lines of weakness 210, meaning having a long axis that is oriented within plus or minus about 5 degrees of the long axis of lines of weakness 210. It will be appreciated that designs in which second partitions 130 are e.g. substantially aligned, or strictly aligned, with lines of weakness 210, may enhance the ability of backing 2 to be hand-torn along a line or lines of weakness 210. That is, such arrangements may minimize the number of second partitions 130 that must be torn through (broken) in order to hand-tear backing 2 along a line or lines of weakness 210.

It will be appreciated that any condition regarding the angular alignment (orientation) of paint-retention pattern partitions relative to hand-tear pattern lines of weakness, does not require that the partitions necessarily be placed at any particular position (i.e., along the longitudinal axis of backing 2) relative to the lines of weakness. However, in some embodiments it may be convenient to arrange the lines of weakness 210 of hand-tear pattern 203, and at least the transversely-extending, longitudinally-spaced partitions 130 of paint-retention pattern 103, in view of each other. For example, lines of weakness 210 may be spaced at an integer multiple of the spacing of partitions 130, and may be arranged so as to fall in between partitions 130, as shown in the exemplary arrangement of FIG. 1. The various spacings may be chosen so that one partition 130 is present between any two lines of weakness 210; or, two, three, four, five, or any convenient number of partitions 130 may be present between any two lines of weakness. (FIG. 1 depicts an exemplary arrangement in which three partitions 130 are present between two lines of weakness 210).

In specific embodiments, a line of weakness may be arranged so that the spacing between the line of weakness and any two partitions 130 nearest the line of weakness, is different, similar or the same (with the last of these being shown in the exemplary arrangement of FIG. 1).

First and second partitions 110 and 130 of paint-retention pattern 103 may be provided at any convenient orientation with regard to the longitudinal and transverse axes of backing 2. However, in some embodiments some or all of second partitions 130 may be oriented at least generally transversely to backing 2, meaning having a long axis that is oriented within plus or minus about 45 degrees of the transverse axis of backing 2. In further embodiments, some or all of second partitions 130 may be oriented within plus or minus about 30 degrees, plus or minus about 20 degrees, or plus or minus about 10 degrees, of the transverse axis of backing 2. In specific embodiments, some or all second partitions 130 may be in strict alignment with the transverse axis of backing 2, meaning having a long axis that is oriented within plus or minus about 5 degrees of the transverse axis of backing 2 (e.g., as exemplified by partitions 130 of FIGS. 1 and 3). (It will be appreciated that a partition does not necessarily need to be continuous to have a long axis, as will be apparent from later discussions herein.)

It will be appreciated that a design in which at least some of second partitions 130 are oriented generally transversely to backing 2 may enhance the ability of backing 2 to be hand-torn at least generally transversely across the width of backing 2. That is, such arrangements may minimize the number of second partitions 130 that must be torn through (broken) in order to hand-tear backing 2 across its transverse width. Designs in which second partitions 130 are oriented strictly transversely to backing 2 may likewise enhance the ability of backing 2 to be hand-torn in a direction strictly transverse to backing 2.

Some or all of first partitions 110 may be at least generally longitudinally aligned with backing 2, meaning having a long axis that is oriented within plus or minus about 45 degrees of the longitudinal axis of backing 2. In further embodiments, some or all of first partitions 110 may be oriented within plus or minus about 30 degrees, plus or minus about 20 degrees, or plus or minus about 10 degrees, of the longitudinal axis of backing 2. In a specific embodiment, some or all first partitions 110 may be in strict alignment with the longitudinal axis of backing 2, meaning having a long axis that is oriented within plus or minus about 5 degrees of the longitudinal axis of backing 2 (e.g., as exemplified by partitions 110 of FIGS. 1 and 3).

In specific embodiments, first partitions 110, and second partitions 130, may each comprise elongate ribs, e.g. continuous ribs (as exemplified by first elongate ribs 120 and second elongate ribs 133 of FIGS. 1 and 3). Thus, in embodiments of the type exemplified in FIGS. 1 and 3, first major side 100 of backing 2 may comprise a multiplicity of first partitions 110, each partition 110 comprising a continuous rib 120 with base 112 and top 111, with a height, width, and an elongate length, and with the elongate length being generally, e.g. strictly, aligned with the longitudinal axis of backing 2 and of tape 1. First major side 100 of backing 2 may additionally comprise a multiplicity of second partitions 130, each partition 130 comprising a continuous rib 133 with base 132 and top 131, with a height, width, and an elongate length, and with the elongate length (long axis) being generally, e.g. strictly, aligned with the transverse axis of backing 2 and of tape 1. As shown in the exemplary design of FIG. 1, in some embodiments elongate ribs 120 and elongate ribs 133 may each comprise a height that is uniform along the length of the rib. In particular embodiments, the height of ribs 120 may be equal to that of ribs 133, again as shown in FIG. 1.

From the above discussions it will be apparent that in many of the designs herein, a microstructured paint-retention pattern may be configured such that at least some first partitions 110 may traverse at least some lines of weakness 210. By this is meant that a long axis (e.g., path) of a first partition 110 may intersect with, and cross, a long axis (e.g., path) of a line of weakness 210, at some location within the elongate length of the first partition and the elongate length of the line of weakness. Such intersecting/traversing does not necessarily require any actual physical intersection (e.g., direct contact) between the partition and the line of weakness. That is, in the case of a discontinuous line of weakness and/or a discontinuous first partition, the intersection (point of traversal) may be a point in space at which the respective paths intersect, rather than an actual physical intersection. In some embodiments, however, such intersection will comprise an actual physical connection.

Given the above discussions, in various embodiments first partitions 110 may be designed so as to enhance the ability of backing 2 to be hand-torn at least generally along the transverse axis "T" of the backing. For example, if first partitions 110 are e.g. generally, or strictly, aligned with the longitudinal axis "L" of backing 2, at least some of these first partitions may need to be torn through during the at least generally transverse hand-tearing of tape 1 (in contrast to e.g. second partitions 130 that may be generally or strictly aligned with transverse axis "T" and thus may be aligned at least generally parallel to the tear direction and thus may not need to be torn during the at least generally transverse hand-tearing of tape 1). At least some of first partitions 110 may thus be designed and/or arranged so as to minimize the resistance to hand-tearing that they provide. In particular, the design of a first partition 110 at its intersection with a line of weakness 210 may be chosen to enhance the ability of the line of weakness to promote and propagate tearing along the line of weakness.

In embodiments in which a line of weakness 210 comprises a groove 211 that is continuous except for where one or more partitions 110 traverses the groove (i.e., crosses through and/or over the groove), portions of partitions 110 that traverse groove 211 can be configured to enhance tearability along the groove. Such configuring may be done on portions of partitions 110 that are within groove 211 (i.e., that are positioned inward relative to major surface 15 of backing 2) and/or that are above groove 211 (i.e., that are positioned outward relative to major surface 15). Additionally, such configuring may be performed on portions of partitions 110 that are near (e.g., adjacent) to a groove 211. Embodiments of all of these various types can be discussed in comparison to FIG. 10, which shows an exemplary tape backing 2 of the general type shown in FIG. 1, except with backing 2 rotated ninety degrees for clarity of presentation. In the embodiment of FIG. 10, the heights of longitudinally-extending partitions 110 (elongate rib 120) are uniform throughout their length, including portions 170 of partition 110 that traverse groove 211. The heights of elongate ribs 120 are equal to the heights of partitions 130 (elongate rib 133).

Figure 11:
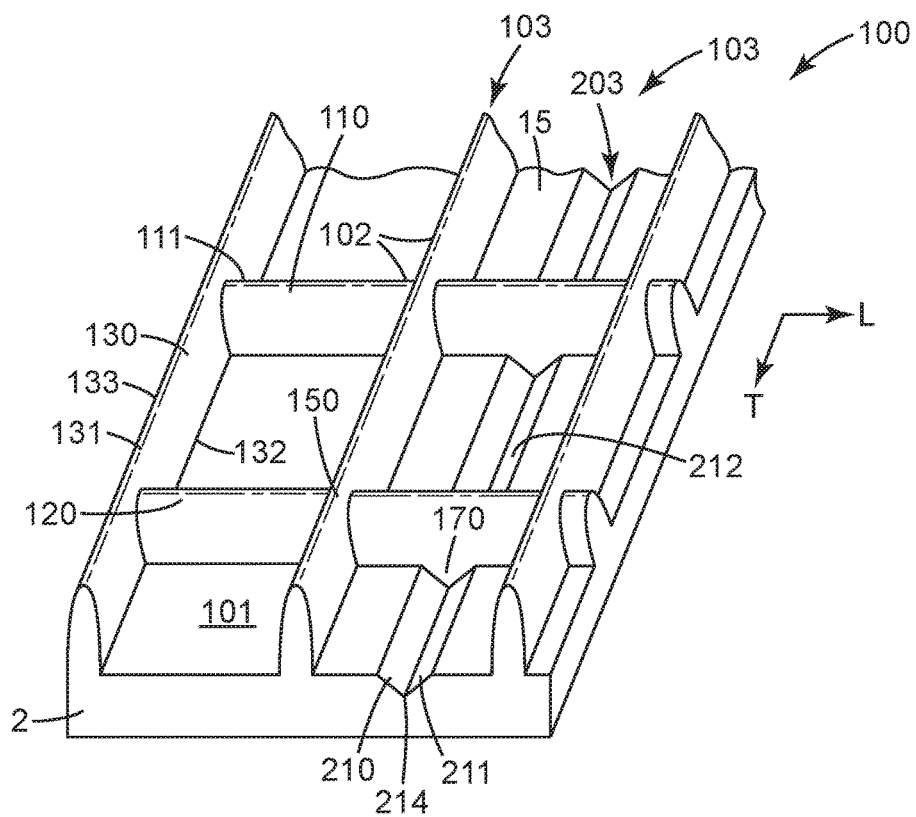
FIG. 11 is a perspective view, from the first major side, of a portion of another exemplary microstructured tape backing comprising coextensive, intersecting microstructured paint-retention and hand-tear patterns.

In contrast, FIG. 11 shows an arrangement in which the heights of elongate ribs 120 are less than the heights of elongate ribs 133, at all locations along ribs 120, including portions 170 that traverse grooves 211. Thus, in such embodiments, at least some of first (generally longitudinally-oriented) elongate ribs 120 may be shorter in height than second elongate ribs 133. Such shorter ribs may present less resistance to being torn through in the process of hand-tearing the backing at least generally transversely across its transverse width. In various embodiments, each first rib 120 may comprise a uniform height (as shown in FIG. 11), with the uniform height being less than about 80%, or less than about 60%, of the height of second ribs 133. In further embodiments, each first rib 120 may comprise a uniform height that is at least about 20%, or at least about 40%, of the height of second ribs 133. All such segments of all such ribs 120 may be at this lower height (with a segment of a rib 120 meaning a length of the rib between its intersections 150 with second ribs 133), as in the exemplary embodiment of FIG. 11. In alternative arrangements, only certain ribs, or certain segments of ribs (e.g., that traverse a groove), might be at such a lower height. For example, only every second, third, fourth or fifth rib 120 may be at such a lower height. Although not shown in any Figure, some or all of first ribs 120 may be (in addition to, or instead of, being shorter in height than second ribs 133) narrower in thickness than second ribs 133; e.g. toward their base, toward their top, and/or any portions therebetween, which may also enhance the ability of backing 2 to be at least generally transversely hand-torn.

Figure 12:
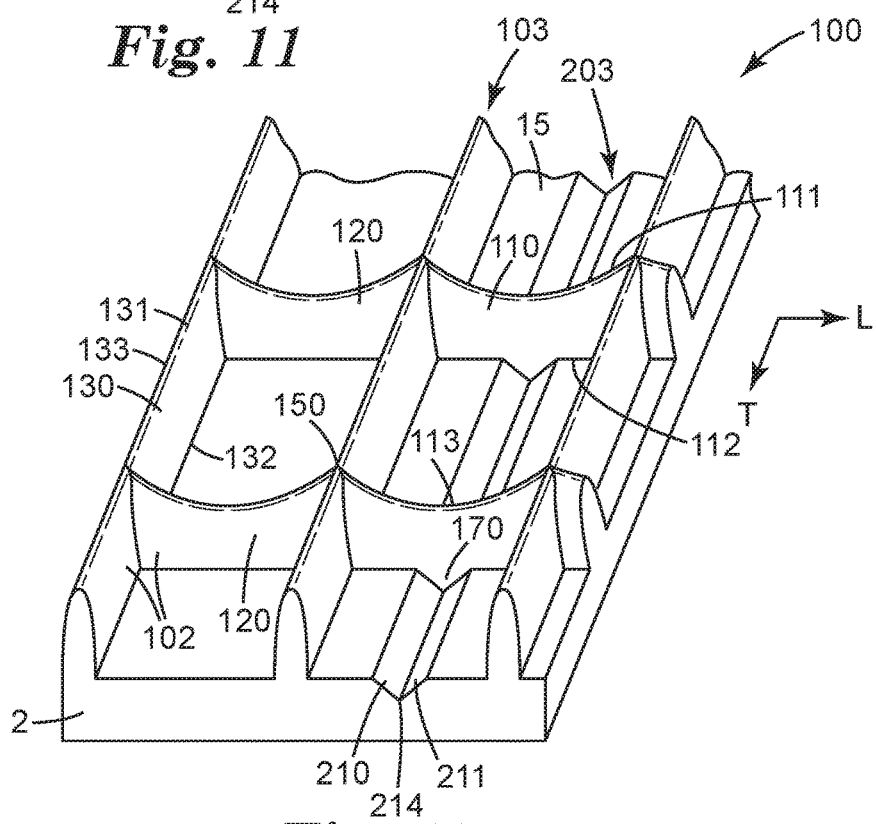
FIG. 12 is a perspective view, from the first major side, of a portion of an another exemplary microstructured tape backing comprising coextensive, intersecting microstructured paint-retention and hand-tear patterns.

Another manner in which first partitions 110 may be configured to enhance the ability of backing 2 to be at least generally transversely hand-torn is shown in exemplary manner in FIG. 12. In designs of this general type, first ribs 120 may be provided in which continuous rib segments (i.e., segments that extend continuously between adjacent intersections 150 with second ribs 133) comprise varying profiles (e.g., smoothly varying, arcuate profiles) such that the height of a portion of rib 120 at a location 113 that is distal to intersections 150 (e.g., at a location where portion 170 of rib 120 traverses groove 211) is less than the height of the rib segment at points adjacent its intersections 150 with second ribs 133. In various embodiments, the heights of ribs 120 at locations 113 distal to intersections 150 may be less than 80% of, less than 70% of, or less than 60% of, the heights of ribs 120 at locations adjacent intersections 150 with second ribs 133. In such designs, the height of some or all of ribs 120 may, at their intersections 150 with ribs 133, be generally the same as the height of ribs 133 (as in the exemplary design of FIG. 12), or may be less than (e.g., no more than 80% of) the height of ribs 133. Only rib segments that actually traverse a line of weakness 210 may be profiled in this manner; or, all such segments of ribs 120 may be profiled, as in the exemplary embodiment of FIG. 12. Although it may not necessarily enhance the ability of backing 2 to be at least generally transversely hand-torn, if desired second ribs 133 may likewise comprise smoothly varying profiles such that the height of rib portions at locations between intersections with first ribs 120 is less than that at points adjacent intersections with first ribs 120. In some embodiments, however, neither first ribs 120, nor second ribs 133, are profiled in the manner described above.

Figure 13:
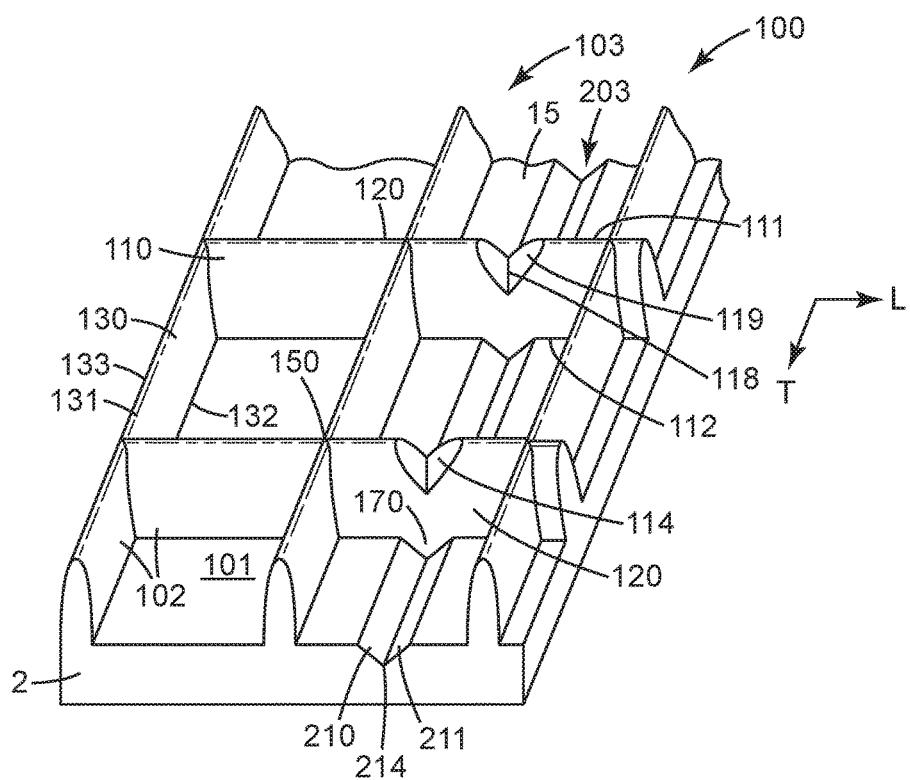
FIG. 13 is a perspective view, from the first major side, of a portion of an another exemplary microstructured tape backing comprising coextensive, intersecting microstructured paint-retention and hand-tear patterns.
Figure 14:
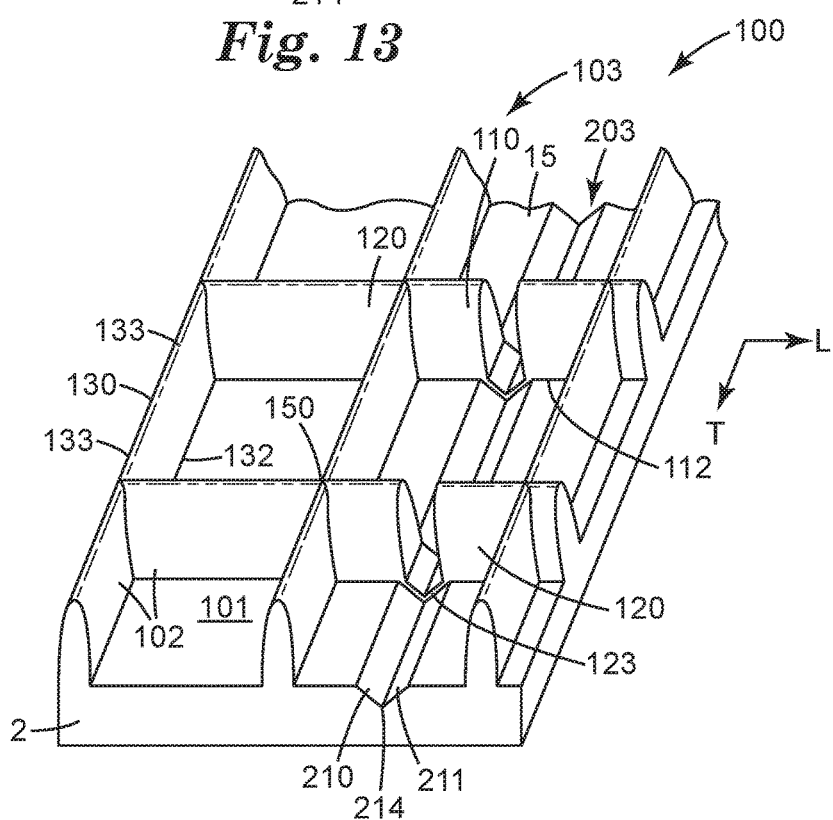
FIG. 14 is a perspective view, from the first major side, of a portion of an another exemplary microstructured tape backing comprising coextensive, intersecting microstructured paint-retention and hand-tear patterns.

Another manner in which first partitions 110 may be configured to enhance the ability of backing 2 to be at least generally transversely hand-torn is shown in exemplary manner in FIG. 13. In designs of this type, at least one notch 114 of a partition 110 (e.g., rib 120) may be superimposed on a groove (or, in general, on a recess that acts to provide a portion of a line of weakness), meaning that notch 114 is provided in portion 170 (of rib 120) that traverses (e.g., lies above and/or within) groove 211. Multiple notches 114 may be spaced down the length of a partition 110, e.g. so that successive notches are superimposed on successive lines of weakness. A notch 114 may comprise a lowest point 118 at which the local height (with respect to major surface 15) of rib 120 is less than about 80% of the height of rib 120 at locations adjacent rib 120's intersections 150 with ribs 133. In various embodiments, the depth of notch 114 may be chosen so that this local rib height is less than about 60%, less than about 40%, or less than about 20%, of the height of rib 120 at other locations (e.g., adjacent rib 120's intersections 150 with ribs 133). Notch 114 may be any suitable shape; e.g., V-shaped, flat-bottomed, etc. Sidewalls 119 of notch 114 may be generally planar (as shown in the exemplary embodiment of FIG. 13); or they may be arcuate, sinusoidal, etc. Sidewalls 119 of notch 114 may meet along a line to form lowest point 118 (e.g., so as to form a generally V-shaped notch of the type depicted in FIG. 13); or notch 114 may comprise a flat bottom surface of any chosen width. Any variation of such approaches may be used; e.g., notch 114 may have a bottom surface, and/or sidewalls, that are arcuate, undulating, etc. In particular embodiments, notch 114 may have an arcuate (e.g., semicircular) profile such that it may e.g. have a "bottom" surface that is a continuation of a sidewall. If desired, the shape and arrangement of the sidewalls 119 and/or the bottom surface of notch 114 may be arranged so that notch 114 comprises a profile that is congruent with (e.g., matches, and is locally parallel to) that of groove 211.

In some embodiments, a partition may be configured so that the partition comprises an extending portion that is superimposed on a groove (or, in general, any recess that acts to provide a portion of a line of weakness) and that is provided within, and partially fills, the groove. By partially fills a groove is meant that at least some part of the extending portion of the partition comprises an outwardmost surface that is below the level of major surface 15 of backing 2. Such an extending portion of a partition, that partially fills a groove, is shown in exemplary manner as feature 123 of FIG. 14. In such embodiments, partition 110 may thus extend at least partially across the lateral width of groove 211, by way of portion 123 that has a shorter height than other sections of partition 110 and that dips down into groove 211 so that the outwardmost surface of portion 123 of partition 110 is below the level of first major surface 15 of backing 2. Providing such a portion 123 may provide that the ability of liquid paint to flow along groove 211 is sufficiently minimized (thus enhancing the performance of paint-retention pattern 103), while at the same time not unacceptably interfering with the ability of line of weakness 210 (groove 211) to promote and propagate tearing. Portion 123 may extend fully across groove 211; or, it may be interrupted, e.g. at or near lowest point 214 of groove 211, for example so as to enhance the ability of groove 211 to propagate a tear.

It will be appreciated that the dimensions, shape, etc. of such a portion 123 of partition 110 that is provided within a groove 211 can be chosen as desired. That is, the height of portion 123 (with respect to major surface 15 of backing 2) can be such that it occupies groove 211 near, or to, the level of major surface 15. Or, the height of portion 123 can be kept very low so that it only protrudes a short distance above lowest point 214 of groove 211. In various embodiments, portion 123 of partition 110 that is within groove 211 can comprise a lowest height that is less than about 25, 15, or 5 microns above the lowest point of the groove. (It will be appreciated that the limiting case in which the height of portion 123 (above the lowest point of the groove), is zero across the entire lateral width of the groove, may approach embodiments of the general type shown in FIG. 15, in which partition 110 is interrupted by a gap through which groove 211 passes.) The outwardmost surface of portion 123 can be profiled so as to be congruent with the profile of groove 211; or, any suitable profile can be chosen. Specifically, the distance that portion 123 locally extends away from a sidewall and/or a bottom surface of groove 211 can be chosen as desired, and may vary at different locations of the sidewall and/or bottom surface.

Figure 15:
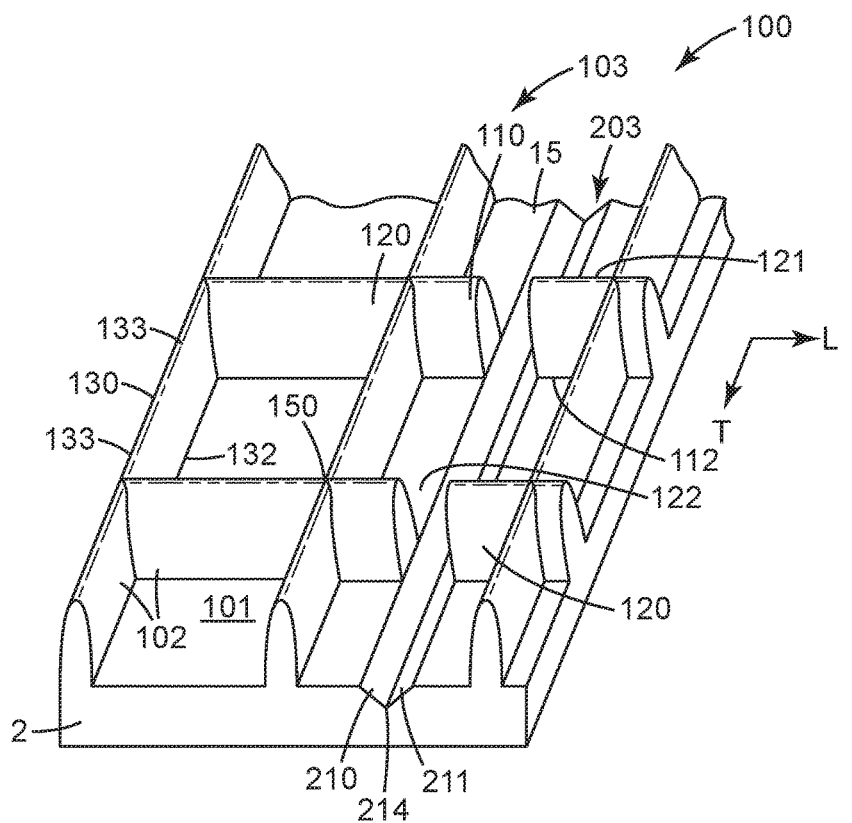
FIG. 15 is a perspective view, from the first major side, of a portion of an another exemplary microstructured tape backing comprising coextensive, intersecting microstructured paint-retention and hand-tear patterns.

In further embodiments, the exemplary design of FIG. 15 is an example of an arrangement in which at least some partitions 110 are in the form of discontinuous ribs 121. In this context, a discontinuous rib means a rib comprising at least one gap 122 in which no part of the rib is physically located within or over a groove 211 (or, in general, a line of weakness), that passes through the gap (that is, so that no part of rib 121 need be torn as a tear propagates along groove 211). Multiple gaps 122 may be spaced down the length of a partition 110, e.g. so that successive gaps are superimposed on successive lines of weakness. A gap 122 may have any suitable design. For instance, rather than partition 110 continuing at a uniform height up to the very edge of groove 211 and then terminating even therewith, the height of partition 110 may decrease along any desired slope (whether steeply, starting from a location close to groove 211, or gradually, starting from a location further away from groove 211). It will be appreciated that partitions 110 with features such as notch 114, gap 122, etc., may be employed even in combination with lines of weakness 210 that are discontinuous rather than being e.g. a continuous groove. For example, a partition may comprise a notch, gap, etc. at a point at which it crosses a line of weakness, even if such crossing point falls e.g. in between two recesses that form a portion of a line of weakness.

It will also be appreciated that, in any of the aforementioned notches, gaps, etc., the profile of such a notch, gap, etc. can take any desired form, whether involving a nearly-vertical step change (as in FIG. 15), an angled, planar sidewall (as in FIG. 13), a combination of a nearly vertical step change and an angled, planar sidewall (as in FIG. 14), and so on. For example, the particular embodiment illustrated in FIG. 16 comprises angled, planar sidewalls 114 that extend to a protruding portion 123 that partially fills groove 211.

Such profiles can also include any desired arcuate profile. And, of course, any combination of such designs can be used.

Figure 17:
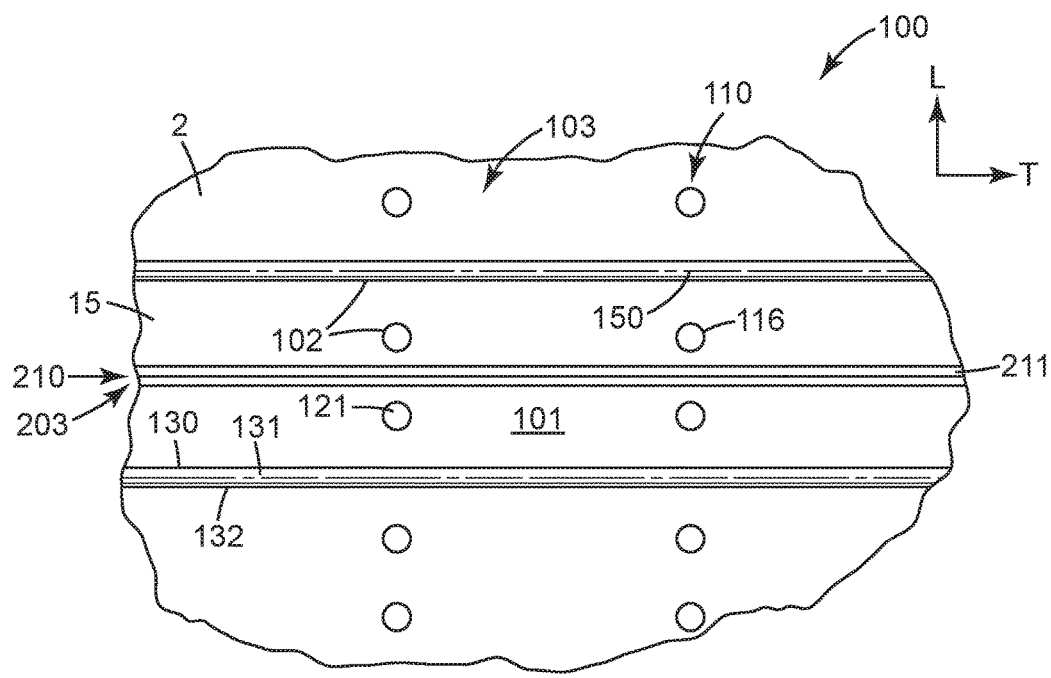
FIG. 17 is a plan view, from the first major side, of a portion of an another exemplary microstructured tape backing comprising coextensive, intersecting microstructured paint-retention and hand-tear patterns.

A further variation of such approaches is shown in exemplary manner in plan view in FIG. 17, in which first partitions 110 comprise discontinuous partitions in the form of outwardly-protruding posts 116. A line of weakness 210 (e.g., a groove 211) can thus pass between any two posts 116, as shown in exemplary manner in FIG. 17. Those of ordinary skill will appreciate that in designs of this type posts 116 may, if appropriately designed and spaced, collectively function as a partition 110 (e.g., in a "picket fence" manner), to at least a sufficient extent to satisfactorily prevent or minimize the passage of liquid paint. In other words, it is not necessary that both, or even either, of partitions 102 must be continuous. This being the case, still another potential design is shown in exemplary manner in FIG. 18, in which not only first partitions 110 are discontinuous (as provided by posts 116), but second partitions 130 are as well (as provided by posts 117). Those of ordinary skill in the art will appreciate that in order to collectively comprise partitions, a set of posts does not necessarily have to be positioned in a strictly linear format (e.g., as in FIGS. 17 and 18). Rather, the posts could be provided in a curved, sinusoidal, staggered, zig-zag, etc. format, as long as the posts are e.g. sufficiently close to each other and of sufficient height and size (e.g., width or diameter) to collectively provide a partition 102. Although shown as circular in FIGS. 17 and 18, such posts may be any convenient shape.

Figure 18:
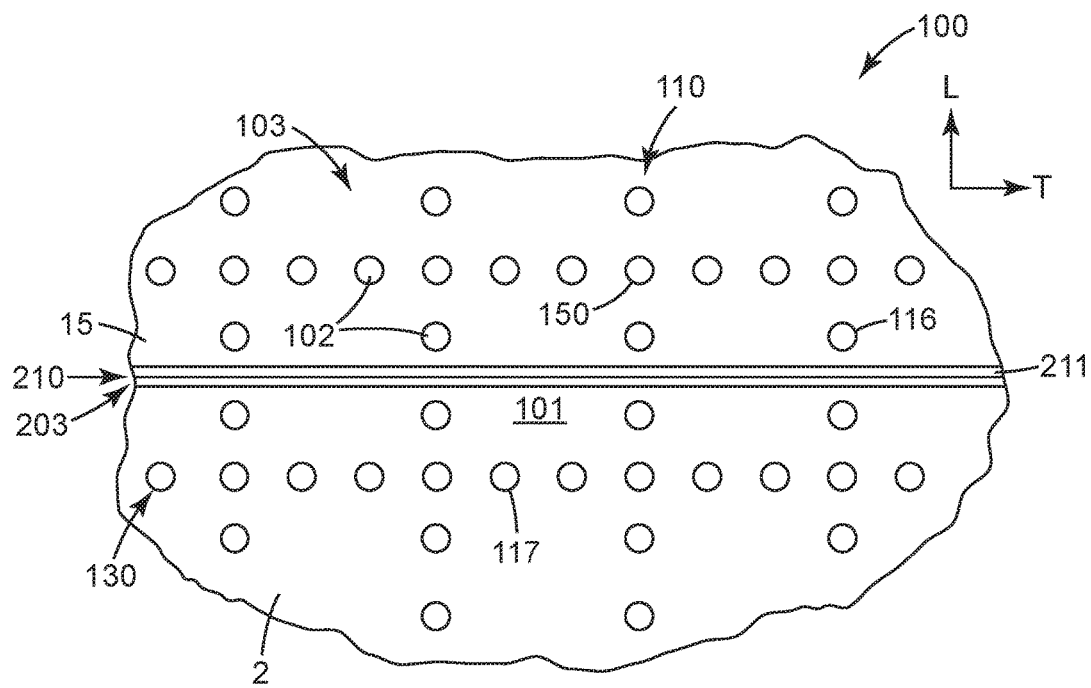
FIG. 18 is a plan view, from the first major side, of a portion of an another exemplary microstructured tape backing comprising coextensive, intersecting microstructured paint-retention and hand-tear patterns.

It will be appreciated that in embodiments of the general type depicted in FIGS. 17 and 18 (comprising discontinuous paint-retention partitions), embodiments of the general type depicted in FIGS. 6-9 (comprising discontinuous lines of weakness), as well as embodiments in which partitions comprise a gap of the type depicted in FIG. 15, the microstructured features (e.g., elongate ribs, posts, etc.) of the microstructured paint-retention pattern, may not necessarily physically intersect with (i.e., directly contact) the microstructured features (e.g., grooves, recesses, etc.) of the hand-tear pattern. However, in such designs the microstructured patterns do intersect at least in the sense that the long axis (path) of at least some partitions of the paint-retention pattern intersects the long axis (path) of at least some lines of weakness, at some location within the long-axis extent of the respective intersecting partitions and lines of weakness. Thus, such designs fall within the definition of coextensive, intersecting microstructured patterns that was presented earlier.

In still further variations, one or more features may be provided within groove 211 that, while not necessarily being an extension of partition 110 in the manner of the above-described portion 123, can serve a similar function as portion 123. For example, in embodiments of the general type shown in FIG. 15, one or more structures (posts, etc.) can protrude from the floor and/or sidewalls of groove 211 within gap 122 of partition 110, so as to minimize the tendency of liquid paint to flow down groove 211 without unacceptably reducing the ability of groove 211 to propagate a tear.

Any suitable combination of any of the above approaches can be used. For example, if a notch or gap in one or more longitudinally-extending ribs (e.g., line of weakness-traversing ribs) is to be used, such ribs may be the same height as transversely-extending ribs, or they may be a lower height. And, in such cases a longitudinally-extending rib may e.g. comprise a uniform height, may e.g. have an arcuate profile similar to that shown in FIG. 12, and so on. Not all ribs longitudinally-extending ribs, nor all portions of a particular longitudinal-extending rib, need be identical, of course. Furthermore, those of ordinary skill will understand that there may be no firm dividing line between many of the above designs. For example, there may be no firm dividing line between a design of the type shown in FIG. 13 in which a segment of a first rib 120 comprises portions of generally constant and equal height, that are interrupted by notch 114 that comprises the lowest rib height, and a design of the type shown in FIG. 12 in which a segment of a first rib 120 comprises a height that decreases smoothly and continuously to a point 113 that comprises the lowest rib height. Likewise, there may be no firm dividing line between a notch 114 as in FIG. 13 and a gap 122 as in FIG. 15. Still further, there may be no firm dividing line between a discontinuous rib 121 of the general type of FIG. 15 (comprising rib segments interrupted by a gap or series of gaps) and a series of posts 116 of the general type illustrated in FIGS. 17 and 18. All such variations and combinations will be understood to be encompassed by the disclosures herein, not merely those representative designs that were chosen to serve as exemplary illustrations.

Thus in summary, the height/profile of a first rib 120 may vary in any suitable manner, whether e.g. smoothly and continuously, or sharply. In various embodiments, the height (i.e., the local height of an outwardmost surface, relative to major surface 15) of a portion 170 of a first rib 120 that is superimposed on a line of weakness, may range from e.g. 80, 60, 40, 20, 10, 5, or even 0%, of the height of some other portion of the first rib (e.g., a portion adjacent an intersection of first rib 120 with a second rib 133). Similarly, such a local height of first rib 120 may range from e.g. 80, 60, 40, 20, 10, 5, or even 0%, of the height of second ribs 133. And, as discussed with respect to portion 123 of a first rib 120 of the design found in FIG. 14, in some embodiments an outwardmost portion of a portion of a rib may be positioned beneath (inwards of) the level of first major surface 15.

Still further, it should be noted that any such combination or design may be chosen from those presented herein, in order to enhance the widthwise hand-tearability of backing 2 while also enhancing the ability of paint-retention pattern 103 to capture and retain paint. Thus, for example, some (e.g., two out of three, four out of five, etc.) of first partitions 110 may comprise ribs of a relatively low height and/or may comprise notches, gaps and/or discontinuities, with only a certain remaining number of ribs having a relatively high height and/or not comprising notches, gaps, discontinuities, etc. These remaining ribs may be spaced apart from each other by intervening lower/notched/gapped and/or discontinuous ribs. The presence of the lower and/or notched or gapped or discontinuous first partitions may enhance the widthwise hand-tearability of backing 2, while the occasional, spaced-apart first partitions that are higher and/or that do not comprise notches, gaps or discontinuities, may ensure that the paint-retention pattern 103 still satisfactorily captures and retains paint.

It should further be noted that while features such as notches, gaps, ribs or rib segments that differ in height, etc., have been primarily discussed above with regard to first partitions 110, any such features and designs might also be employed with second partitions 130, if desired. It is further noted that if second partitions 130 comprise a varying height, in herein-described embodiments in which a ratio of the (local) height of a first partition 110, to the height of a second partition 130 is calculated, an overall average height of second partition 130 can be used in such calculations.

Figure 19:
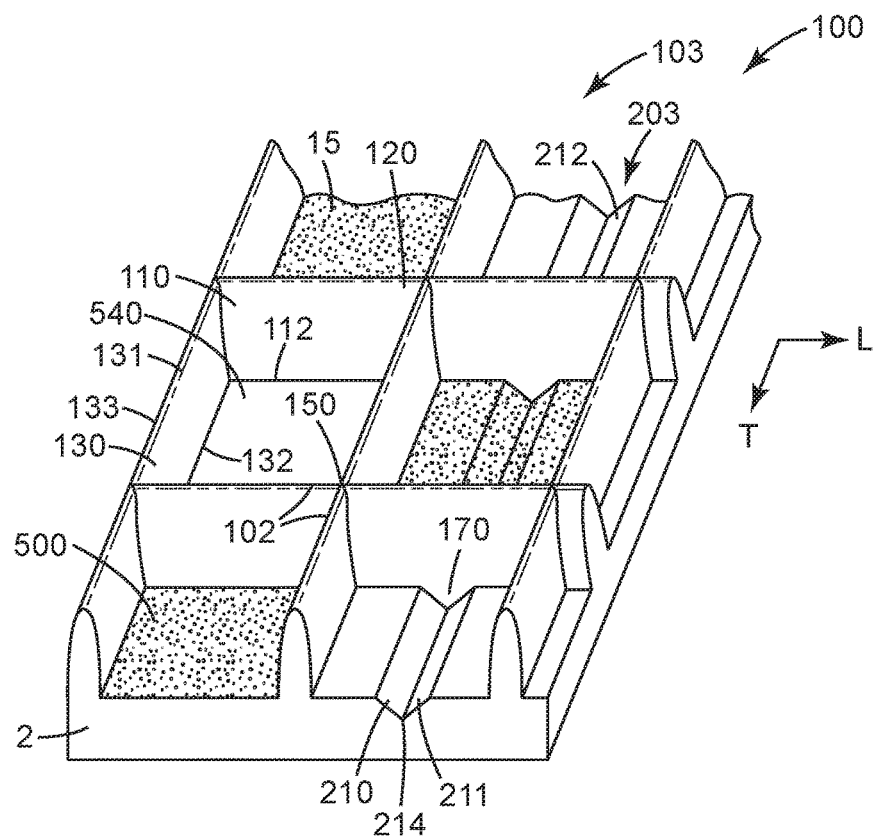
FIG. 19 is a perspective view, from the first major side, of a portion of an another exemplary microstructured tape backing comprising coextensive, intersecting microstructured paint-retention and hand-tear patterns and also comprising areas with a textured surface.

In some embodiments, major surface 15 of first major side 100 of backing 2, from which partitions 102 protrude and from which recessions of a line of weakness 210 are recessed, may comprise a flat surface (e.g., on a dimensional scale of about 0.2 microns to about thirty microns). In some embodiments, at least some areas 500 of major surface 15 of backing 2 may optionally comprise surface texture as depicted in FIG. 19. In this context, an area of major surface 15 with surface texture denotes an area with features that deviate from a flat planar surface in such manner as to lower the gloss of that area from that which would be exhibited by the flat planar surface.

Such gloss measurements may be performed locally, e.g. by whatever method and apparatus that can provide gloss measurements on a local scale, or that can provide parameters that can be correlated with gloss units (such methods might include e.g. profilometry, confocal microscopy, etc.). Or, such gloss measurements may be performed on macroscopic regions collectively formed by low-gloss areas 500 (such macroscopic regions are discussed later herein). Such measurements may be performed with conventional gloss meters e.g. such as the gloss meter available from BYK Additives and Instruments of Columbia, Md., under the trade designation MICRO-TRI GLOSS (and may be measured e.g. in generally similar manner to the procedures found in ASTM Test Methods D2457-08 and D523-08, both as specified in 2008). It will be appreciated that such gloss measurements are often performed at a 60 degree angle of incidence; however (for example in the event that a particular design of the partitions of paint-retention pattern 103 might unduly interfere with gloss measurements at 60 degrees, e.g., by a shadowing effect), the gloss measurements can be performed at an angle at which any effect of such partitions is minimized, e.g. at 85 degrees. It will also be recognized that, depending on the nature of the surface texture of an area, and/or the nature of the paint-retention pattern 103 and/or the hand-tear pattern 203, the gloss of an area/region might depend on the orientation of the incident light relative to any orientation of the texture and/or the microstructured pattern (e.g., relative to the longitudinal "L" and transverse "T" axes of the backing, as depicted in FIG. 19). In such circumstances, an average gloss may be obtained that is derived from gloss measurements taken at various orientations with respect to the "L" and "T" axes of the backing.

The surface texture of an area 500 may be characterized by profilometry, as will be understood by the ordinary artisan. Such profilometry can be done along several orientations relative to the "L" and "T" axes of backing 2, if the surface texture has an orientation dependence. (Such profilometry measurements of this surface texture may omit any contribution of paint-retention pattern 103 and/or hand-tear pattern 203). Results of such profilometric characterization are often cast in terms of surface roughness, e.g. $R_a$, which is a well-recognized average surface roughness parameter. In various embodiments, textured, low-gloss areas 500 may comprise an $R_a$ of greater than 0.2 μm, 0.4 μm, 0.8 μm, 2, μm, or 4 microns. In some embodiments, textured, low-gloss areas 500 and/or (later-described) macroscopic low-gloss regions 501 collectively formed therefrom, may exhibit a matte finish (appearance), as will be recognizable to the ordinary artisan.

In some embodiments, substantially all of major surface 15 of backing 2, (not necessarily including areas occupied by partitions 102 of microstructured paint-retention pattern 103 and/or recesses of hand-tear pattern 203), may comprise a low-gloss textured surface 500, e.g. a molded textured surface. In various embodiments sidewalls 212 (and bottom surfaces, if present) of elongate grooves 211 may or may not comprise textured surfaces. In various embodiments, partitions 102 of paint-retention pattern 103 may or may not comprise textured surfaces.

In some embodiments, some areas 500 of major surface 15 may comprise a textured surface that imparts low gloss, and some areas 540 of major surface 15 may comprise high gloss, as depicted in FIG. 19. (It will be understood that the terms high and low gloss are used herein in relative terms, meaning that a low-gloss area has a gloss that is lower than that of a high-gloss area, and vice-versa). For example, in the exemplary embodiment of FIG. 19, the stippled surface shading of areas 500 indicates textured, low-gloss areas, whereas unstippled areas 540 are high-gloss areas. In various embodiments, such a low-gloss textured surface area 500 may exhibit a gloss of less than about 40, 20, 10, 5, or 2 gloss units. In various embodiments, high-gloss areas 540 may exhibit a gloss of at least 20, 40, 60, or 80 gloss units. In various embodiments, low-gloss areas 500 may exhibit a gloss that is lower than that of high-gloss areas 540, by at least 5, 10, 20, 40, or 60 gloss units (irrespective of the absolute value of the gloss units of the respective areas), e.g.

so as to provide sufficient contrast in gloss that a difference in the character of visible light reflected from the high-gloss and the low-gloss areas is perceivable by an observer.

While first, high-gloss areas 540 are not precluded from having some molded surface texture, such areas will have less surface texture than areas 500 so that they exhibit a higher gloss than that exhibited by areas 500, as discussed above. In specific embodiments, untextured areas 540 may comprise a generally flat surface (e.g., on a dimensional scale of 0.2 µm or more); e.g., an optically smooth surface, such as that obtained (during the forming of backing 2) by molding the plastic against a very smooth tooling surface such as a polished metal roll or the like. High-gloss areas 540 can be characterized in terms of gloss units, and/or can be characterized by profilometry or the like, in similar manner to the methods discussed above for areas 500. In various embodiments, high-gloss areas 540 may comprise a surface roughness $R_a$ of less than 0.2 µm, 0.1 µm, 0.05 µm, or 0.02 µm. (It will be appreciated that the above-presented definitions of low gloss and high gloss merely require that areas 500 comprise a lower gloss than areas 540, without requiring any absolute value of the gloss, or of the $R_a$, be exhibited by the respective areas. Thus, it should not be inferred that an $R_a$ of e.g. 0.2 µm is a defining boundary between "high" and "low" gloss. Rather, the surface roughness $R_a$ is merely an additional parameter that may be used to characterize the high and low gloss areas.

Such arrangements may provide low-gloss areas and high-gloss areas of major surface 15 of backing 2 in any desired pattern. In this context, the term area encompasses a surface portion of any size, including microscopic areas (e.g., those that are too small to be seen by the unaided human eye, e.g. down to a few square microns in size). In some embodiments, high-gloss areas 540 may be arranged so as to collectively comprise macroscopic regions 541 (i.e., areas of greater than about 2 mm²) with high gloss, whether areas 540 that form regions 541 are in contiguous arrangement, or whether they are separated from each other e.g. by some portion of low-gloss areas 500 and/or by some portion of hand-tear pattern 203 and/or paint-retention pattern 103. Similarly, low-gloss areas 500 may be arranged so as to collectively comprise macroscopic regions 501 with low gloss (e.g., with a matte finish), whether areas 500 are in contiguous arrangement, or whether they are separated from each other e.g. by some portion of high-gloss areas 540 and/or hand-tear pattern 203 and/or paint-retention pattern 103.

Figure 20:
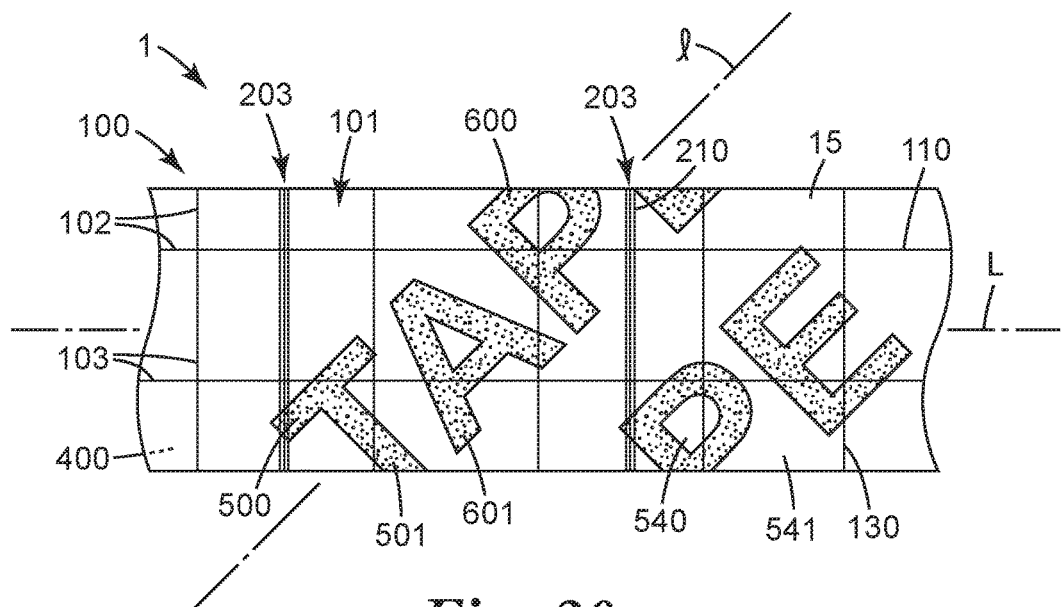
FIG. 20 is a plan view of an exemplary microstructured tape backing comprising coextensive, intersecting microstructured paint-retention and hand-tear patterns and also comprising areas with a textured surface, which areas collectively form informational indicia.

In some embodiments, such macroscopic regions 541 and 501 may be arranged in combination with each other to collectively provide any suitable decorative pattern. Such a decorative pattern might comprise a representation of an object or scene, an abstract pattern, a random pattern, a regular pattern, and so on. In some embodiments, high-gloss areas/regions and low-gloss areas/regions may be arranged in combination to collectively provide at least one informational indicia 600 as shown in exemplary manner FIG. 20. (It is noted that in FIG. 20, hand-tear pattern 203 and paint-retention pattern 103 are not to scale, for clarity of presentation). Such an informational indicia can comprise e.g. a logo, trade designation, or the like (whether such indicia is in the form of text, or a symbol or picture, or a mixture of both). It will be appreciated that these features may allow backing 2 to display a non-printed, informational indicia (akin to e.g. a watermark) that is observable at least when visible light is impinged onto, and reflected from, the first major side of backing 2, and that is obtained without having to deposit any pigment, ink, label, etc. onto backing 2. In some embodiments, an informational indicia may comprise a text string (whether alone, or in combination with other visual elements), as exemplified by text string 601 of FIG. 20. In further embodiments, backing 2 may comprise a longitudinal axis "L" and the text string may comprise a long axis "l" as shown in FIG. 20. In specific embodiments, the long axis of the text string may be oriented at an angle of from about 20 degrees to about 70 degrees with respect to the longitudinal axis of backing 2, as shown in FIG. 20. In further embodiments, the long axis of the text string may be oriented at from about 35 degrees to about 60 degrees with respect to the longitudinal axis of backing 2.

In any of these embodiments, low gloss regions 501 may individually or collectively provide a background, with certain high gloss regions 541 individually or collectively providing a specific observable feature (e.g., an image or a letter) thereupon. Or, the reverse may be the case. Or, combinations of both approaches may be employed.

In various embodiments, low-gloss macroscopic regions can 501 exhibit a gloss that is lower than that of high-gloss macroscopic regions 541, by at least 5, 10, 20, 40, or 60 gloss units (e.g., irrespective of the absolute value of the gloss units of the respective regions), so as to provide sufficient contrast in gloss that e.g. a reflected-light indicia may be observed. It will be appreciated that a high-gloss macroscopic region 541 may comprise some number of low-gloss (e.g., microscopic) areas 500; however, as long as the macroscopic region 541 is dominated by high-gloss areas 540 so as to exhibit macroscopic high gloss, region 541 is still considered to be a high-gloss region. Similar considerations apply with regard to low-gloss macroscopic regions 501.

In some embodiments, a textured surface of low-gloss area 500 is a molded textured surface. By this is meant that the texture-imparting features are obtained by, and during, the molding of backing 2 (e.g., in the same molding operation used to form the microstructured paint-retention pattern and the microstructured hand-tear pattern). As such, a molded textured surface may be distinguished from a textured surface obtained from treating of an existing surface (e.g., obtained from abrading, ablating, physical roughening of such a surface or from depositing texture-imparting materials thereonto).

Any suitable molded features can be used to lower the gloss of an area 500 (e.g., relative to area 540), e.g. to provide an appearance that would be perceived by an ordinary artisan to be a matte finish. A feature, in this context, can be anything that represents a departure or deviation (along the z-axis of backing 2) from a flat planar surface, which deviation is on a scale suitable to scatter visible light and thus to reduce specular reflection from the surface. Such features may be randomly provided, or may comprise a predetermined pattern. Such features of an area 500 may comprise e.g. those that protrude outward relative to the average level of major surface 15 (i.e., the position of major surface 15, along an axis (the z-axis) normal to the major plane of backing 2) within the area 500 (e.g., as measured and averaged over the area 500, not including any features of paint-retention pattern 103 and/or hand-tear pattern 203). Such features may also comprise those that are recessed inward relative to this average level. Such protruding features may be characterized e.g. as protrusions, nodules, hillocks, pyramids, stems, posts, bumps, ridges, etc.; such recessed features may be characterized e.g. as depressions, holes, pits, fissures, furrows, crevices, divots, etc. A textured surface may possess a combination of protruding and recessed features (e.g., furrows and ridges, protruding and recessed pyramids, nodules with pits therebetween, etc.).

It will be appreciated that the presence of such features in a size range adequate to scatter light (e.g., in the range of from about 0.2 microns to about thirty microns) may provide such functionality. Such features may comprise e.g. surfaces that may be locally planar (i.e., over the range of a few microns or less), but that have such a small size and/or are arranged so as to collectively provide a low gloss. Examples of substrates of this general type are described e.g. in U.S. Patent Application Publication 2010/0302479. Or, such features may comprise e.g. surfaces that are non-planar (curved) over the dimensional range of a few microns or less (e.g., that are in the form of nodules or the like). Examples of substrates of this general type are described e.g. in U.S. Patent Application Publication 2007/0014997. Substrates with features of both types, and/or features with any combination of locally planar and/or locally arcuate surfaces, may be used. (It is noted that with surface texture present, the average z-axis level of major surface 15 in the area neighboring a feature of a paint-retention pattern 103 and/or of a hand-tear pattern 203 may be used as a reference datum plane for purposes of characterizing the height of the feature.)

The use of textured surface areas and less-textured (e.g., generally flat) surface areas to respectively provide low-gloss areas and regions and high-gloss areas and regions is described in more detail in U.S. Provisional patent application Ser. No. 14/380,888, filed the same day as the present application, and entitled Substrate Comprising High and Low Gloss Areas With a Physical Microstructure Superimposed Thereon, which application is incorporated by reference herein in its entirety.

Backing 2, microstructured paint-retention pattern 103 of first major side 100, and microstructured hand tear pattern 203 of first major side 100, are defined herein as constituting a monolithic plastic unit made of a monolithic plastic material. By this is meant that partitions 102 that define microstructured paint-retention pattern 103 (whether partitions 102 are in the form of continuous partitions as in FIG. 1, discontinuous partitions as in FIG. 17 or 18, etc.) are integrally connected to backing 2 and were formed by being molded therewith. Likewise, this means that the portions of material (e.g., surfaces) that define the recessed features (e.g., grooves, valleys, holes, etc.) that provide lines of weakness 210 of hand-tear pattern 203 are likewise integrally connected to backing 2 and were formed by being molded therewith. (If present, texture-imparting features of e.g. areas 500 will be likewise integrally connected to backing to and were formed by being molded therewith). Such a monolithic plastic unit may be conveniently formed e.g. by providing a polymeric thermoplastic film or a molten polymeric thermoplastic extrudate and molding the first major surface so as to form backing 2, partitions 102 that define microstructured paint-retention pattern 103, and the recesses that provide lines of weakness 210 of microstructured hand-tear pattern 203, all at the same time, as an integral unit. In various embodiments, the overall thickness of backing 2, from second major surface 415 of second major side 400, to the outermost portion of partitions 102 (e.g., to the tops 111 and 131 of ribs 120 and 133, respectively, with respect to the exemplary embodiment of FIG. 1), may be at least about 25 microns, at least about 50 microns, at least about 60 microns, or at least about 70 microns. In further embodiments, the overall thickness of backing 2 may be at most about 250 microns, at most about 140 microns, at most about 120 microns, or at most about 100 microns. In some embodiments, the material that comprises backing 2 and second major surface 415 thereof, the material that comprises partitions 102 that define microstructured paint-retention pattern 103 of first major side 100, and the material whose surfaces define the recesses (e.g., grooves, valleys, holes, etc.) that provide lines of weakness 210 of hand-tear pattern 203 of first major side 100, are all of the same composition.

The plastic material of backing 2 is by definition a moldable polymeric thermoplastic material that is not a foamed or porous material. In some embodiments, the plastic material may be noncellulosic, meaning that it contains less than about 5 wt. % cellulosic material (e.g., cellulose, paper, regenerated cellulose, wood fibers, wood flour, etc., with, in this context, cellulose acetate and the like not considered to be cellulosic materials). In particular embodiments, the plastic material may be melt-processable, e.g. extrudable. The moldable polymeric thermoplastic material may be made from, or include, any of a variety of materials. Homopolymers, copolymers and blends of polymers may be useful, and may contain a variety of additives. Suitable thermoplastic polymers may include, for example, polyolefins such as polypropylene or polyethylene; polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, and engineering polymers such as polyketones or polymethylpentanes. Mixtures of such polymers may also be used.

In some embodiments, the plastic material may be a polyolefinic material, defined herein as being any homopolymer, copolymer, blend, etc., of any olefinic polymers (e.g., polyethylenes, polypropylenes, and so on). In some embodiments, the polyolefinic material may contain at least about 90 wt. %, at least about 95 wt. %, or at least about 98 wt. % of polyethylenes, not counting the weight of any mineral fillers that may be present. (In this context, by polyethylenes are meant polymers comprised of at least 95% ethylene units. In further embodiments, the polyethylenes are ethylene homopolymers.) In some embodiments, the polyolefinic material may consist essentially of ethylene homopolymers, noting that this requirement (in addition to not including the weight of any mineral fillers) does not preclude the presence of processing aids, plasticizers, antioxidants, colorants, pigments, and the like, at least some of which may contain some small level of non-polyethylene polymers. In certain embodiments, the polyolefinic material may contain substantially no polypropylene, as well as substantially no non-olefinic polymers. (Those of ordinary skill will appreciate that as used herein, the term "substantially no" does not preclude the presence of some extremely low, e.g. 0.5% or less, amount of material, as may occur e.g. when using large scale production equipment subject to customary cleaning procedures.)

Suitable polyethylene homopolymers for use in backing 2 may include e.g. high-density polyethylene, medium-density polyethylene, low-density polyethylene, linear low-density polyethylene, ultra-low-density polyethylene, and the like. In specific embodiments, the polyethylene homopolymers may consist essentially of a blend of low density polyethylene (LDPE, i.e. having a density of between 0.88 g/cc and 0.93 g/cc) and high density polyethylene (HDPE, i.e. having a density of between 0.94 g/cc and 0.97 g/cc), at a weight ratio of from about 90:10 LDPE:HDPE to about 10:90 LDPE:HDPE. In further embodiments, the weight ratio of LDPE to HDPE may be from about 70:30 to about 30:70, from about 60:40 to about 40:60, or from about 55:45 to about 45:55. In specific embodiments, the LDPE/HDPE blend may comprise one or more inorganic (e.g., particulate mineral) fillers, which may include e.g. calcium carbonate, kaolin, talc, silica, titanium dioxide, glass fibers, glass bubbles, and the like. Such fillers may be present e.g. at from about 2% to about 20% by weight of the total weight of the material of backing 2. Other additives may be included as desired for particular purposes.

Figure 21:
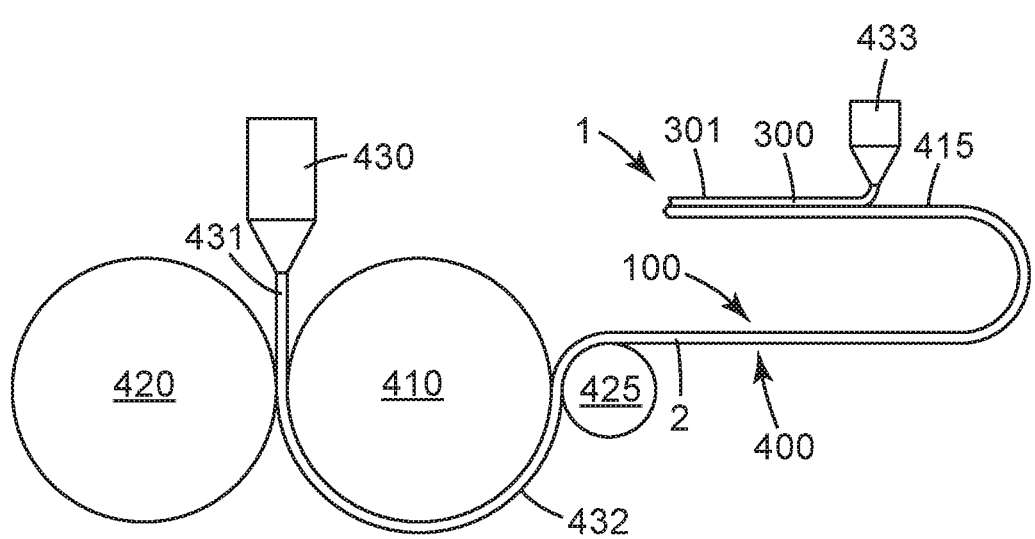
FIG. 21 is a diagrammatic view of an exemplary process for making a microstructured tape backing and tape.

Shown in FIG. 21 is an exemplary apparatus and process 400 for making backing 2 and tape 1. Extruder 430 can be used to extrude molten polymeric thermoplastic extrudate 431, one major surface of which then contacts tooling roll 410, which roll bears on its surface the negative of the desired features to be imparted to first major side 100 of backing 2. Additionally the opposing major surface of extrudate 431 contacts backing roll 420, which roll may have no particular microstructure (unless it is desired to impart a particular microstructure to second major side 400 of backing 2). For example, the surface of backing roll 420 may comprise e.g. a conventional matte-finish surface or a conventional polished surface, whichever may be more desirable (e.g., so as to enhance the coatability and adherability of a pressure-sensitive adhesive onto the thus-formed surface of backing 2). Conveniently, the contacting of the extrudate with the two molding surfaces may be done essentially simultaneously, e.g. by impinging molten extrudate 431 into a narrow gap (nip) in between rolls 410 and 420. Those of ordinary skill will appreciate that, rather than rolls 410 and/or 420, such surfaces as may be provided by belts, platens, and the like, can be used if desired. A tooling surface may be metal (e.g., in the form of a metal roll as in the exemplary configuration of FIG. 21), or may comprise softer materials, e.g. polymeric belts, sleeves or coatings disposed upon a metal backing roll. Such tooling surfaces, with the negative of the desired features thereon, may be obtained e.g. by engraving, knurling, diamond turning, laser ablation, electroplating or electroless deposition, or the like, as will be familiar to those of skill in the art.

It may be convenient to provide such tooling by micromachining, e.g. by diamond turning. For example, a tool (e.g., a metal roll) can be provided comprising a machinable tooling surface (e.g., copper). The tooling surface can be machined so as to leave behind protrusions (for example, ridges) that are the negative of the recesses (e.g., grooves) of the hand-tear pattern that is desired to be formed in the backing. The tooling surface can be further machined so as to comprise recesses (e.g., channels) that are the negative of the partitions of the paint-retention pattern that is desired to be formed in the backing. If features such as gaps, notches, etc. are desired to be provided as described above, the machining tool can be manipulated as desired e.g. as the machining tool traverses across the previously formed ridge of the tooling surface. By way of a specific example, if it is desired that no part of a partition extend across, or reside within, a groove in the backing (e.g., to produce a backing of the general type depicted in FIG. 15), the machining tool can be withdrawn sufficiently far that it does not alter the previously formed ridge as it traverses past the ridge. Such manipulations may be performed e.g. with a machining tool that is controlled by a fast tool servo, as described e.g. in U.S. Pat. No. 7,677,146.

If it is desired to provide a gloss-lowering molded surface texture on at least portions of a major surface of the backing, at least portions of the major surface of the tooling can be processed so as to comprise the negative of such texture. (Such a processing step might be conveniently performed e.g. after a step in which the tooling surface is machined to leave behind ridges, and before a step in which the tooling surface is machined to form channels). This may be performed by any suitable methods (e.g., electroplating, electroless deposition, chemical etching, laser ablation, etc.). Or, a fast tool servo may be used to machine the selected major surface areas in such manner as to produce a chaotic or randomly textured structure in desired areas, e.g. as described in Examples 8 and 9 of U.S. Patent Application Publication 2008/0049341.

If the molding surfaces are provided by rolls (e.g. a metal tooling roll and a metal or rubber-coated metal backing roll), it may be convenient to maintain the rolls at a temperature between about 21 degrees C. and about 130 degrees C. In various embodiments, the rolls may be maintained at temperature of between about 50 degrees C. and about 110 degrees C., or between about 70 degrees C. and about 90 degrees C. A nip pressure between the rolls may be maintained in the general range of e.g. 5000-8000 N/m, e.g. 6000-6200 N/m. If an extrusion process is used, in various embodiments the extrudable compositions (polymeric resins) may have a Melt Flow Index of between about 1 and 20, or between about 5 and 15, and may be extruded at die temperatures of e.g. 250-270 degrees C. A line speed in the range of e.g. 10-20 meters per minute may be convenient. If desired, rather than molten extrudate 431, a pre-existing moldable polymeric thermoplastic film can be heated and contacted with tooling surfaces to mold the desired microstructured patterns on the major surfaces thereof.

Molten extrudate 431 that has been contacted with a tooling surface so as to impart paint-retention pattern 103 and hand-tear pattern 203 to a first major side of the extrudate, can be solidified so as to form backing 2 with paint-retention pattern 103 and hand-tear pattern 203 upon the first major surface thereof, as a monolithic plastic unit. It may be convenient that the molded extrudate be held in contact with the tooling surface, e.g. of a tooling roll, e.g. by following a path around a significant portion of the roll as shown in exemplary manner in FIG. 21, to allow such solidification. If desired, a takeoff roll 425 may be provided to assist in the handling of the molded, solidified backing 2 upon its removal from a tooling roll. Pressure-sensitive adhesive 300 can then be disposed on second major side 400 of backing 2, e.g. by using coater 433. The deposition of pressure-sensitive adhesive 300 can be in-line in the same process as the molding, as in the exemplary configuration of FIG. 21. Or, it can be done off-line, in a separate process.

Pressure-sensitive adhesive (layer) 300 can be deposited onto second major side 400, e.g. onto major surface 415 thereof, by any suitable process, including for example coating methods including solvent coating methods or hot melt coating methods, e.g. knife coating, roll coating, reverse roll coating, gravure coating, wire wound rod coating, slot orifice coating, slot die coating, extrusion coating, or the like. In many cases such processes may involve the deposition of a pressure-sensitive adhesive precursor onto second major side 400 of backing 2 and then transforming the precursor into pressure-sensitive adhesive 300 (e.g., by removal of solvent, by curing or crosslinking, etc.) In various embodiments, the thickness of pressure-sensitive adhesive 300 may be at least about 20 microns, at least about 30 microns, or at least about 40 microns. In further embodiments, the thickness of pressure-sensitive adhesive 300 may be at most about 100 microns, at most about 80 microns, or at most about 60 microns.

Any suitable pressure-sensitive adhesive material or composition can be used in pressure-sensitive adhesive 300.

Pressure-sensitive adhesives are normally tacky at room temperature and can be adhered to a surface by application of, at most, light finger pressure and thus may be distinguished from other types of adhesives that are not pressure-sensitive. A general description of useful pressure-sensitive adhesives may be found in Encyclopedia of Polymer Science and Engineering, Vol. 13, Wiley-Interscience Publishers (New York, 1988). Additional description of useful pressure-sensitive adhesives may be found in Encyclopedia of Polymer Science and Technology, Vol. 1, Interscience Publishers (New York, 1964). It may be convenient that the adhesive material be chosen so as to provide good adhesion to a surface, while also being removable under moderate force without leaving a residue, e.g. a visible residue.

Examples of suitable materials for the pressure-sensitive adhesive may include e.g. polymers based on acrylate and/or methacrylate materials, natural or synthetic rubbers, block copolymers, silicones, and so on. Suitable polymers and/or monomer units therein may include, but are not limited to: polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers; poly-alpha-olefins, amorphous polyolefins, polysiloxanes, ethylene vinyl acetates, polyurethanes, polyvinylpyrrolidones, and any combinations thereof. Examples of suitable (meth)acrylate materials include polymers of alkyl acrylate or methacrylate monomers such as e.g. methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, and combinations thereof. Examples of commercially available block copolymers include those available under the trade designation KRATON from Kraton Polymers, Westhollow, Tex. Additionally, the adhesives can contain additives such as tackifiers, plasticizers, fillers, antioxidants, stabilizers, pigments, and the like.

Whether made by a process of the general type shown in FIG. 21 or by any other suitable process, tape 1 may be conveniently provided in the form of a roll 20 as shown in exemplary manner in FIG. 2. In some embodiments, tape 1, and roll 20 thereof, do not include any kind of release liner (e.g., a paper or plastic film bearing a release surface, whether supplied by the film itself or by a low-energy coating thereupon, such release liners being well known in the adhesive arts). That is, in such embodiments roll 20 is a self-wound roll meaning that it is wound directly upon itself with outward surface 301 of pressure-sensitive adhesive 300 being in releasable contact with the outwardmost surfaces of partitions 102 that define paint-retention pattern 103 of first major side 100 of backing 2. For example, if backing 2 is of the general type shown in FIG. 1, in roll 20 pressure-sensitive adhesive 300 would be in releasable contact with at least tops 111 and 131 of ribs 120 and 133 respectively. By releasable contact is meant that pressure-sensitive adhesive 300 is adhered to the outwardmost surfaces of partitions 102 sufficiently to provide roll 20 with adequate mechanical integrity to acceptably maintain the form of a roll (that is, so that the roll does not unacceptably unroll from its self-wound condition too easily), but so that the adhesive force between pressure-sensitive adhesive 300 and the outwardmost surfaces of partitions 102 is low enough that adhesive 300 can be debonded and separated from the partition surfaces without unacceptable force being necessary and without unacceptably damaging either the partitions or the adhesive or debonding the adhesive from second major side 400 of backing 2. This releasable contact may be gauged by way of the force required to unwind tape 1 from its self-wound condition. In various embodiments tape 1 may comprise an unwind force of at least 2, 3, or 4 ounces of force per inch width of tape (0.22, 0.33, or 0.44 N/cm width of tape). In further embodiments, tape 1 may comprise an unwind force of at most 40, 30, or 20 ounces of force per inch width of tape (4.4, 3.3, or 2.2 N/cm width of tape).

Those of skill in the art will appreciate that the adhesive properties of pressure-sensitive adhesive 300, and the design of paint-retention pattern 103, may be designed in combination so as to achieve a desired range of unwind force. That is, a paint-retention pattern 103 with more closely spaced partitions and/or with partitions with a wider top surface, which would provide an increased surface area for pressure-sensitive adhesive 300 to bond to, might advantageously be combined with a relatively weak (e.g., low-tack) pressure-sensitive adhesive composition; conversely, if the partitions are widely spaced and/or have very narrow top surfaces, they might advantageously be combined with a relatively strongly bonding pressure-sensitive adhesive. In this context, it may be useful to characterize the bondable surface area of partitions 102 that is available for pressure-sensitive adhesive 300 to bond to. For example, in the exemplary embodiment of FIG. 1, the bondable surface area may be provided by top surfaces 111 of first ribs 120 and by top surfaces 131 of second ribs 133. In the exemplary embodiment of FIG. 11, first ribs 120 may be sufficiently shorter in height than second ribs 133 that the bondable surface area may be provided only by top surfaces 131 of second ribs 133 (and, e.g., not by top surfaces 111 of first ribs 120). In the exemplary embodiment of FIG. 12 (with first ribs 120 that vary in height), the bondable surface area may be provided by top surfaces 131 of second ribs 133, and by a portion of top surfaces 111 of first ribs 120. In a case in which both first ribs 120 and second ribs 133 comprise arcuate shapes (e.g., in which both resemble the shape of first ribs 120 of FIG. 12) in which the rib portions at their intersections are the farthest outward-protruding, the bondable surface area may be provided mainly by the top surfaces of ribs at such intersections. In various embodiments and however achieved, the bondable surface area offered by partitions 102 may comprise at least about 1%, at least about 2%, at least about 5%, at least about 10%, or at least about 15%, of the nominal surface area (i.e., length times width) of first major side 100 of backing 2. In further embodiments, the bondable surface area may comprise at most about 35%, at most about 30%, or at most about 25%, of the nominal surface area of first major side 100 of backing 2.

If desired, first major side 100 of backing 2, e.g. at least the outwardmost portions and/or surfaces of partitions 102, may be treated to as to enhance or decrease the ability of pressure-sensitive adhesive 300 to adhere to it. Treatments which may decrease the bonding ability include e.g. the deposition of low surface energy conformal coatings to the outwardmost surfaces of partitions 102. Such low surface energy conformal coatings are conveniently available in the form of so-called low adhesion backsizes and the like. If desired, low adhesion backsize coatings may be applied in such manner (e.g., by gravure coating) that the coating is primarily applied only to outwardmost surfaces (i.e., the surface areas that are contactable by pressure-sensitive adhesive 300) of partitions 102. Alternatively, such coatings may also be applied to surfaces within one or more microreceptacles 101, e.g. a floor surface of a microreceptacle 101, such as may be supplied by major surface 15 of backing 2 within a microreceptacle 101. Treatments which may increase the bonding ability may include e.g. corona treatment, plasma treatment, flame treatment, or the like; or, deposition (e.g., coating) of a primer, tie layer, or the like. (Those of ordinary skill will appreciate that such treatments, coatings, etc., may also enhance the ability of paint-retention pattern 103 to retain liquid paint and/or to anchor dried paint thereupon or therewithin). Likewise, if desired, second major side 400 of backing 2 can be treated so as to enhance the ability of pressure-sensitive adhesive 300 to adhere to it. Such treatment may comprise e.g. corona treatment, plasma treatment, flame treatment, or the like; or, deposition (e.g., coating) of a primer, tie layer, or the like.

In order to use tape 1, a length of the tape may be removed from an elongate length, e.g. a roll 20, of the tape. This may be performed by hand-tearing the tape across its transverse width, at the desired location, although scissors, a knife, or any other suitable cutting implement may be used if convenient. The hand-tearing may be performed by grasping, with each hand, portions of the tape that longitudinally bracket the desired tear location, and moving one portion of the tape in a first direction and the other portion in a generally opposite direction so as to apply shear force at the desired tear location to initiate and propagate a tear at least generally transversely across the width of the tape. Once the length of tape is thus obtained, it can be applied and adhered to a desired portion of a surface to be masked. Alternatively, a terminal portion of the tape may, while still attached to roll 20, be applied and adhered to a desired portion of a surface and then a remaining portion of the elongate length of the tape (e.g., roll 20 itself) may be manipulated (e.g., twisted or translated) so that the non-adhered portion of the tape is at least generally transversely torn in a location e.g. near the closest point at which the tape is adhered to the surface. Both of these methods are well known to those of skill in the art. If desired, tape 1 may be used in conjunction with a masking film, and may be conveniently applied (e.g., along with such a masking film) to a surface by use of a masking tool, e.g. the product available from 3M Company of St. Paul, Minn., under the trade designation 3M HAND-MASKER DISPENSER.

Tape 1 having been applied to a desired portion of a surface, adjacent portions of surfaces can then be painted as desired (the term paint is used broadly herein and encompasses any coating, primer, varnish, and the like). At any suitable time (e.g., after the paint has dried to a desired extent), tape 1 can then be removed from the surface. Tape 1 can be used to mask any desired surface in preparation for painting with any suitable liquid paint, whether such paint be applied with a sprayer, brush, roller, etc. (In this context a paint sprayer specifically excludes ink-jetting apparatus). Such paint may be e.g. latex or oil-based. Such paints may be distinguished from e.g. ink-jettable inks and the like, which are typically deposited only onto horizontally oriented surfaces (with respect to gravity), in very small volumes (e.g., picoliter-sized droplets). In such ink-jettable inks, the main concern is typically the quality of the formed image (e.g., minimizing the degree to which the deposited very small volumes of different color inks may migrate and/or diffuse into each other in such manner as to blur the colors and/or edges of images).

Tape 1 as disclosed herein may comprise an additional advantage in at least some embodiments, in that it may be able to be extensively transversely curved (which might be done by some apparatus or device, but may be most likely to be done manually by a user of the tape) if desired. In this context, to transversely curve an elongate length of tape 1 means to form it into a continuous curved shape that lies in a generally flat. Such an ability may allow a single elongate length of tape 1 to be transversely curved to match a shape or edge (e.g., an edges of an oval or round window) that conventionally might require numerous short, linear lengths of tape to be used in combination, and/or might require lengths of tape to be manually folded, to match. Those of ordinary skill will appreciate that the ability of tape 1 to be extensively transversely curved means that at least some portions of backing 2, e.g. those close to one transverse minor edge of backing, must be able to stretch at least somewhat, without rupturing or tearing, upon application of stretching force to these portions of backing 2 in order to transversely curve tape 1. It will be further appreciated that the same portions of backing 2 must nevertheless be able to be at least generally transversely torn upon application of shear force to backing 2, in order that the hand-tear property of tape 1 is achieved. Such abilities might be expected to be in conflict with each other. Furthermore, it might be expected that the presence of first partitions 110, especially if oriented with their long axes generally, e.g. strictly, aligned with the longitudinal axis of backing 2, would resist both tearing and stretching and thus would interfere with both abilities. However, backing 2, bearing microstructured paint-retention pattern 103 upon it, may comprise the ability to both be at least generally transversely hand-torn, and to be transversely curved.

Although discussed herein primarily in the context of being used for masking applications e.g. in connection with painting, those of ordinary skill will appreciate that tape 1 as disclosed herein may find use in other applications as well. It will however be evident to those ordinary skill that, in any application, tape 1 as it will be used by an end user will comprise backing 2 with pressure-sensitive adhesive 300 thereupon, therefore backing 2 is different from, and cannot be equated with, any kind of liner, release liner, protective film or the like, that is removed from contact with an adhesive layer and discarded before the actual end use of the adhesive.

LIST OF EXEMPLARY EMBODIMENTS

Embodiment 1

A hand-tearable plastic tape, comprising; a plastic backing comprising a longitudinal axis and a transverse width and axis, and comprising a first major side and an oppositely-facing second major side, wherein the first major side of the backing comprises a microstructured paint-retention pattern comprising microreceptacles that are at least partially defined by a multiplicity of first microstructured partitions and a multiplicity of second microstructured partitions at least some of which intersect with first microstructured partitions to define microreceptacles thereby; wherein the first major side of the backing also comprises a microstructured hand-tear pattern comprising a multiplicity of lines of weakness at least some of which comprise a long axis that is oriented at least generally transversely to the backing, wherein the microstructured paint-retention pattern and the microstructured hand-tear pattern are coextensive and intersecting with each other; and wherein a pressure-sensitive adhesive is disposed on the second major side of the backing.

Embodiment 2

The tape of embodiment 1 wherein at least some of the lines of weakness are continuous lines of weakness each comprising a continuous groove that extends across the entire transverse width of the first side of the backing.

Embodiment 3

The tape of embodiment 2 wherein at least some of the continuous lines of weakness comprise a long axis that is oriented within plus or minus 5 degrees of the transverse axis of the backing.

Embodiment 4

The tape of any of embodiments 2-3 wherein at least some of the continuous grooves comprise sidewalls comprising a textured surface.

Embodiment 5

The tape of embodiment 1 wherein at least some of the lines of weakness are discontinuous lines of weakness that extend across the entire transverse width of the backing, each discontinuous line of weakness being collectively defined by a multiplicity of recesses that are spaced across the entire width of the backing.

Embodiment 6

The tape of embodiment 5 wherein at least some of the discontinuous lines of weakness comprise a long axis that is oriented within plus or minus 5 degrees of the transverse axis of the backing.

Embodiment 7

The tape of any of embodiments 1-6 where the paint-retention pattern comprises a multiplicity of microreceptacles each comprising an average area of from about 10,000 to about 100,000 square microns, and wherein at least some of the first and second microstructured partitions comprise a height of from about 20 µm to about 80 µm.

Embodiment 8

The tape of any of embodiments 1-7 wherein at least some of the second microstructured partitions comprise a long axis that is oriented within plus or minus about 20 degrees of the long axis of at least some of the lines of weakness, and that is oriented at least generally transversely to the backing.

Embodiment 9

The tape of embodiment 8 wherein at least some of the first microstructured partitions are generally longitudinally aligned with the longitudinal axis of the backing.

Embodiment 10

The tape of embodiment 9 wherein the first microstructured partitions each comprise a long axis that is oriented within plus or minus about 5 degrees of the longitudinal axis of backing, wherein the second microstructured partitions each comprise a long axis that is oriented within plus or minus 5 degrees of the transverse axis of the backing and within plus or minus 5 degrees of the long axis of each of the lines of weakness, and wherein the long axis of each of the lines of weakness is oriented within plus or minus 5 degrees of the transverse axis of the backing.

Embodiment 11

The tape of embodiment 1 wherein at least some of the first microstructured partitions comprise first elongate ribs and wherein at least some of the second microstructured partitions comprise second elongate ribs.

Embodiment 12

The tape of embodiment 11 wherein the second elongate ribs comprise uniform heights and wherein the first elongate ribs comprise uniform heights that are the same as the heights of the second elongate ribs.

Embodiment 13

The tape of embodiment 11 wherein at least some portions of some of the first elongate ribs comprise a local height, at least at a location that is superimposed on a line of weakness at a point at which the first elongate rib traverses the line of weakness, that is less than about 60% of a height of the second elongate ribs.

Embodiment 14

The tape of embodiment 11 wherein at least some of the first elongate ribs comprise a multiplicity of notches, the notches being spaced down the length of the elongate rib with each notch being superimposed on a line of weakness at a point at which the first elongate rib traverses the line of weakness, and wherein each notch comprises a lowest point at which the local height of the first elongate rib is less than 60% of the height of the first elongate rib at a location proximate its intersection with a second elongate rib.

Embodiment 15

The tape of embodiment 14 wherein the lines of weakness are continuous grooves and wherein at least some of the notches are configured so that a portion of the first elongate rib extends into the groove so that an outwardmost surface of at least a part of the extending portion of the first elongate rib is located inward from the first major surface of the first side of the backing.

Embodiment 16

The tape of embodiment 11 wherein at least some of the first elongate ribs comprise a multiplicity of gaps, the gaps being spaced down the length of the elongate rib with each gap being superimposed on a line of weakness at a point at which the first elongate rib traverses the line of weakness, with the gap being configured so that no part of the first elongate rib is located within, or over, the line of weakness that passes through the gap.

Embodiment 17

The tape of embodiment 1 wherein at least some of the first microstructured partitions are discontinuous partitions each comprising a series of rib segments or a series of posts.

Embodiment 18

The tape of any of embodiments 1-17 wherein at least some areas of the first major surface of the backing comprise a textured surface.

Embodiment 19

The tape of embodiment 18 wherein the at least some areas with textured surfaces collectively comprise macroscopic regions of the first major surface which exhibit a gloss of less than 10 gloss units when measured at 85 degrees.

Embodiment 20

The tape of any of embodiments 1-19 wherein substantially all of the first major surface of the backing exhibits a gloss of less than 10 gloss units when measured at 85 degrees.

Embodiment 21

The tape of any of embodiments 1-19 wherein the first major side of the tape backing comprises some macroscopic regions with a higher gloss, and further comprises some other macroscopic regions with a lower gloss, that is lower in gloss than the higher-gloss regions by at least 10 gloss units, when measured at 85 degrees.

Embodiment 22

The tape of embodiment 21 wherein the higher gloss and lower gloss areas collectively provide an informational indicia that is observable when visible light is impinged upon the first major side of the tape backing and is reflected therefrom.

Embodiment 23

The tape of any of embodiments 1-22 wherein the plastic material contains, less any mineral fillers present, at least about 95 wt. % of polyethylene homopolymers that consist essentially of a blend of low density polyethylene and high density polyethylene, at a blend ratio of from about 60:40 to about 40:60 by weight.

Embodiment 24

The tape of any of embodiments 1-23 wherein the pressure sensitive adhesive is chosen from the group consisting of (meth)acrylate adhesives, natural rubber adhesives, synthetic rubber adhesives, silicone adhesives, and block copolymer adhesives.

Embodiment 25

The tape of any of embodiments 1-24 wherein the tape comprises an elongate length in the form of a self-wound roll in which a major surface of the pressure-sensitive adhesive is in releasable contact with at least outwardmost surfaces of the microstructured first and/or second partitions of the first major side of the tape.

Embodiment 26

The tape of any of embodiments 1-25 wherein a low adhesion backsize coating is present on at least outwardmost surfaces of the microstructured first and/or second partitions of the first major side of the tape.

Embodiment 27

A method of painting a first surface portion while masking a second surface portion so that it is not painted, the method comprising: adhesively attaching a length of hand-tearable plastic tape to the second surface portion, the hand-tearable plastic tape comprising a backing comprising a longitudinal axis and a transverse width and axis, and comprising a first major side and an oppositely-facing second major side, wherein the first major side of the backing comprises coextensive, intersecting microstructured paint-retention and hand-tear patterns, and wherein a pressure-sensitive adhesive is disposed on the second major side of the backing; and, applying liquid paint to at least the first surface portion.

Embodiment 28

The method of embodiment 27, wherein the method uses the tape of any of embodiments 1-26.

Embodiment 29

A method of making a hand-tearable plastic tape comprising a backing with a first major side with coextensive and intersecting microstructured paint-retention and hand-tear patterns, the method comprising: contacting a first major surface of a molten polymeric extrudate with a first tooling surface that comprises a negative of the microstructured paint-retention pattern and a negative of the microstructured hand-tear pattern, so that the first major surface of the extrudate is molded against the first tooling surface so as to form a backing with coextensive microstructured paint-retention and hand-tear patterns; and, disposing a pressure-sensitive adhesive on the second major side of the backing.

Embodiment 30

The method of embodiment 29 further comprising the step of self-winding the elongate length of hand-tearable tape to form a self-wound roll in which a major surface of the pressure-sensitive adhesive is in releasable contact with at least portions of microstructured partitions defining the paint-retention pattern of the first major side of the tape.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:
1. A hand-tearable plastic tape, comprising;
a plastic backing comprising a longitudinal length and a longitudinal axis and a transverse width and transverse axis, and comprising a first major side and an oppositely-facing second major side, wherein the first major side of the backing comprises a microstructured paint-retention pattern comprising microreceptacles that are at least partially defined by a multiplicity of first microstructured partitions and a multiplicity of second microstructured partitions at least some of which intersect with the first microstructured partitions to define microreceptacles thereby, wherein at least some of the first microstructured partitions comprise first elongate ribs and wherein at least some of the second microstructured partitions comprise second elongate ribs;

wherein the first major side of the backing also comprises a microstructured hand-tear pattern comprising a multiplicity of lines of weakness at least some of which comprise a long axis that is oriented at least generally transversely to the backing, wherein the microstructured paint-retention pattern and the microstructured hand-tear pattern are coextensive and intersecting with each other, wherein at least some of the first elongate ribs comprise a multiplicity of notches, the notches being spaced down the length of the elongate rib with each notch being superimposed on a line of weakness at a point at which the first elongate rib traverses the line of weakness, and wherein each notch comprises a lowest point at which the local height of the first elongate rib is less than 60% of the height of the first elongate rib at a location proximate its intersection with a second elongate rib;

and wherein a pressure-sensitive adhesive is disposed on the second major side of the backing.

2. The tape of claim 1 wherein at least some of the lines of weakness are continuous lines of weakness each comprising a continuous groove that extends across the entire transverse width of the first side of the backing.

3. The tape of claim 2 wherein at least some of the continuous lines of weakness comprise a long axis that is oriented within plus or minus 5 degrees of the transverse axis of the backing.

4. The tape of claim 2 wherein at least some of the continuous grooves comprise sidewalls comprising a textured surface.

5. The tape of claim 1 wherein at least some of the lines of weakness are discontinuous lines of weakness that extend across the entire transverse width of the backing, each discontinuous line of weakness being collectively defined by a multiplicity of recesses that are spaced across the entire transverse width of the backing.

6. The tape of claim 5 wherein at least some of the discontinuous lines of weakness comprise a long axis that is oriented within plus or minus 5 degrees of the transverse axis of the backing.

7. The tape of claim 1 where the microstructured paint-retention pattern comprises a multiplicity of microreceptacles each comprising an average area of from about 10,000 to about 100,000 square microns, and wherein at least some of the first and second microstructured partitions comprise a height of from about 20 µm to about 80 µm.

8. The tape of claim 1 wherein at least some of the second microstructured partitions comprise a long axis that is oriented within plus or minus about 20 degrees of the long axis of at least some of the lines of weakness, and that is oriented at least generally transversely to the backing.

9. The tape of claim 8 wherein at least some of the first microstructured partitions are generally longitudinally aligned with the longitudinal axis of the backing.

10. The tape of claim 9 wherein the first microstructured partitions each comprise a long axis that is oriented within plus or minus about 5 degrees of the longitudinal axis of backing, wherein the second microstructured partitions each comprise a long axis that is oriented within plus or minus 5 degrees of the transverse axis of the backing and within plus or minus 5 degrees of the long axis of each of the lines of weakness, and wherein the long axis of each of the lines of weakness is oriented within plus or minus 5 degrees of the transverse axis of the backing.

11. The tape of claim 1 wherein the lines of weakness are continuous grooves and wherein at least some of the notches are configured so that a portion of the first elongate rib extends into the groove so that an outwardmost surface of at least a part of the extending portion of the first elongate rib is located inward from the first major surface of the first side of the backing.

12. The tape of claim 1 wherein at least some areas of the plastic backing on the first major side comprises a textured surface.

13. The tape of claim 1 wherein the backing contains, less any mineral fillers present, at least 95 wt. % of polyethylene homopolymers that consist essentially of a blend of low density polyethylene and high density polyethylene, at a blend ratio of from about 60:40 to about 40:60 by weight.

14. The tape of claim 1 wherein the pressure sensitive adhesive is chosen from the group consisting of (meth) acrylate adhesives, natural rubber adhesives, synthetic rubber adhesives, silicone adhesives, and block copolymer adhesives.

15. The tape of claim 1 wherein the tape comprises an elongate length in the form of a self-wound roll in which a major surface of the pressure-sensitive adhesive is in releasable contact with at least outwardmost surfaces of the microstructured first and/or second partitions of the first major side of the tape.

16. The tape of claim 1 wherein a low adhesion backsize coating is present on at least outwardmost surfaces of the microstructured first and/or second partitions of the first major side of the tape.

17. A method of painting a first surface portion while masking a second surface portion so that it is not painted, the method comprising:
adhesively attaching a length of the hand-tearable plastic tape of claim 1 to the second surface portion; and,
applying liquid paint to at least the first surface portion.

18. A hand-tearable plastic tape, comprising;
a plastic backing comprising a longitudinal length and a longitudinal axis and a transverse width and transverse axis, and comprising a first major side and an oppositely-facing second major side,
wherein the first major side of the backing comprises a microstructured paint-retention pattern comprising microreceptacles that are at least partially defined by a multiplicity of first microstructured partitions and a multiplicity of second microstructured partitions at least some of which intersect with the first microstructured partitions to define microreceptacles thereby,
wherein at least some of the first microstructured partitions comprise first elongate ribs and wherein at least some of the second microstructured partitions comprise second elongate ribs;

wherein the first major side of the backing also comprises a microstructured hand-tear pattern comprising a multiplicity of lines of weakness at least some of which comprise a long axis that is oriented at least generally transversely to the backing, wherein the microstructured paint-retention pattern and the microstructured hand-tear pattern are coextensive and intersecting with each other, wherein at least some of the first elongate ribs comprise a multiplicity of gaps, the gaps being spaced down the length of the elongate rib with each gap being superimposed on a line of weakness at a point at which the first elongate rib traverses the line of weakness, with the gap being configured so that no part of the first elongate rib is located within, or over, the line of weakness that passes through the gap;

and wherein a pressure-sensitive adhesive is disposed on the second major side of the backing.

19. The tape of claim 18 wherein at least some of the first microstructured partitions are discontinuous partitions each comprising a series of rib segments or a series of posts.

20. The tape of claim 18 wherein the backing contains, less any mineral fillers present, at least 95 wt. % of polyethylene homopolymers that consist essentially of a blend of low density polyethylene and high density polyethylene, at a blend ratio of from about 60:40 to about 40:60 by weight.

21. The tape of claim 18 wherein the pressure sensitive adhesive is chosen from the group consisting of (meth) acrylate adhesives, natural rubber adhesives, synthetic rubber adhesives, silicone adhesives, and block copolymer adhesives.

22. The tape of claim 18 wherein the tape comprises an elongate length in the form of a self-wound roll in which a major surface of the pressure-sensitive adhesive is in releasable contact with at least outwardmost surfaces of the microstructured first and/or second partitions of the first major side of the tape.

23. The tape of claim 1 wherein a low adhesion backsize coating is present on at least outwardmost surfaces of the microstructured first and/or second partitions of the first major side of the tape.

* * * * *

UNITED STATES PATENT AND TRADEMARK OFFICE
CERTIFICATE OF CORRECTION

PATENT NO. : 9,624,406 B2  
APPLICATION NO. : 14/380882  
DATED : April 18, 2017  
INVENTOR(S) : Joseph Bartusiak It is certified that error appears in the above-identified patent and that said Letters Patent is hereby corrected as shown below:

<u>Column 10</u>
Line 46, delete "hand-tom" and insert -- hand-torn --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*